JOHN R. BOS
DAVID B. HINDAL
FRED W. LOY
MARSHALL P. WHITE
INVENTORS.

BY Peter J. Murphy
ATTORNEY

Sept. 17, 1963  J. R. BOS ETAL  3,103,735
POSITIONING APPARATUS

Filed April 6, 1959  23 Sheets-Sheet 3

Sept. 17, 1963    J. R. BOS ETAL    3,103,735
POSITIONING APPARATUS
Filed April 6, 1959    23 Sheets-Sheet 4

Sept. 17, 1963   J. R. BOS ETAL   3,103,735
POSITIONING APPARATUS
Filed April 6, 1959   23 Sheets-Sheet 5
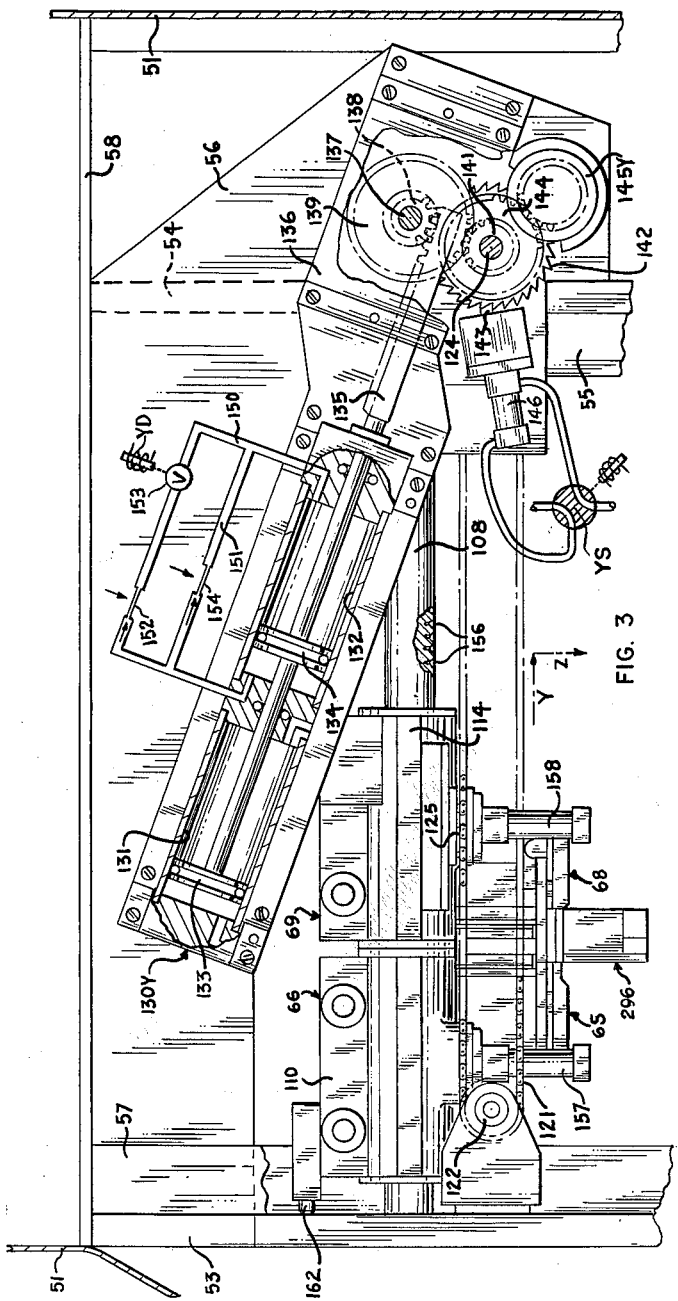
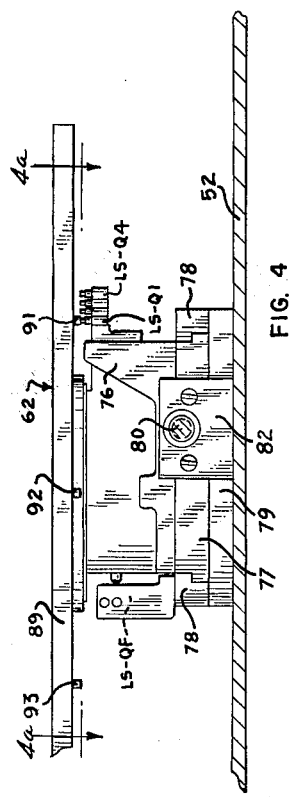
JOHN R. BOS
DAVID B. HINDAL
FRED W. LOY
MARSHALL P. WHITE
INVENTORS.
BY *Peter J. Murphy*
ATTORNEY

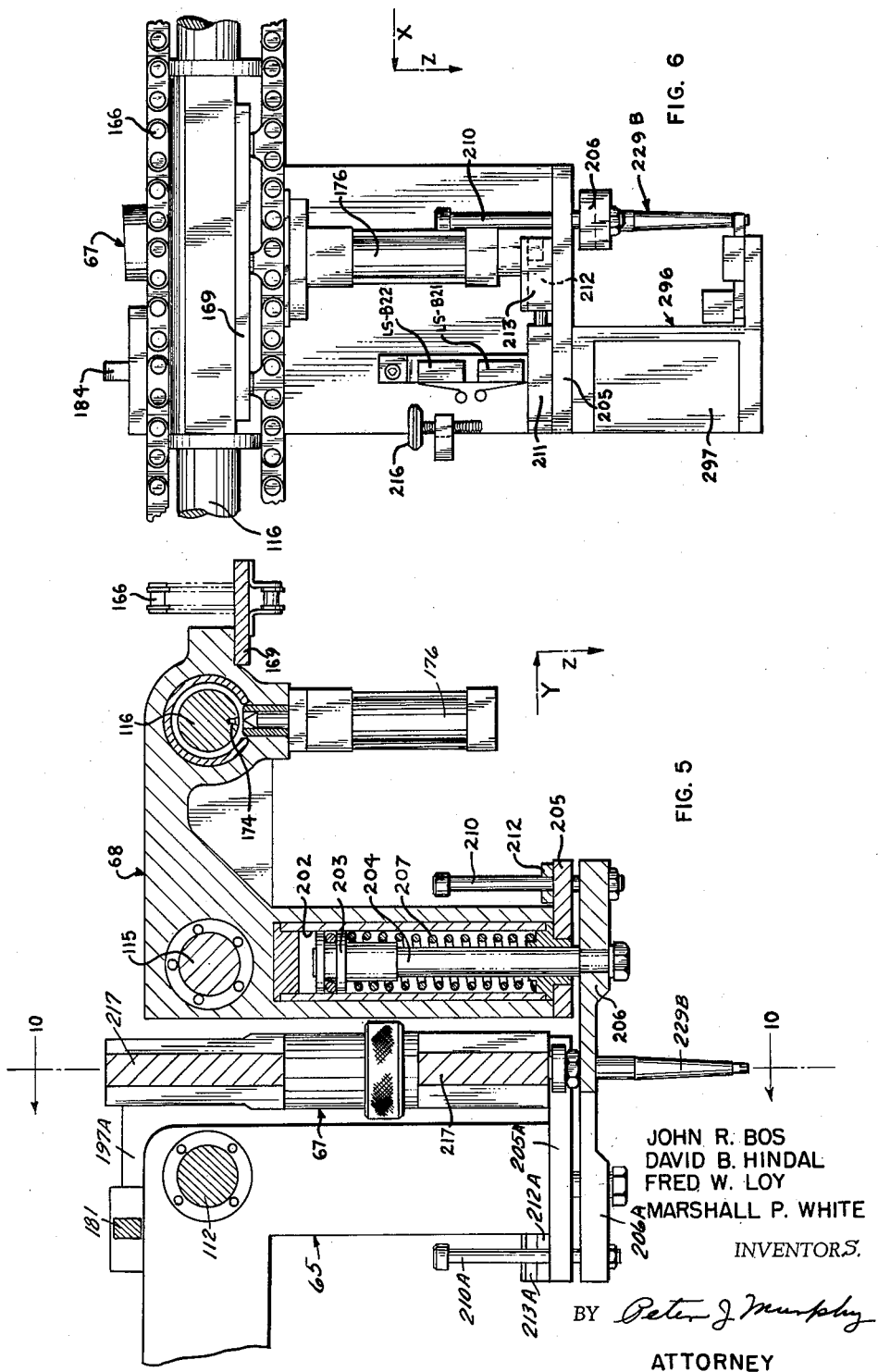

Sept. 17, 1963 J. R. BOS ETAL 3,103,735
POSITIONING APPARATUS

Filed April 6, 1959 23 Sheets-Sheet 8

JOHN R. BOS
DAVID B. HINDAL
FRED W. LOY
MARSHALL P. WHITE
INVENTORS.

BY Peter J. Murphy
ATTORNEY

Sept. 17, 1963

J. R. BOS ETAL 3,103,735

POSITIONING APPARATUS

Filed April 6, 1959

JOHN R. BOS
DAVID B. HINDAL
FRED W. LOY
MARSHALL P. WHITE

*INVENTORS.*

BY *Peter J. Murphy*

ATTORNEY

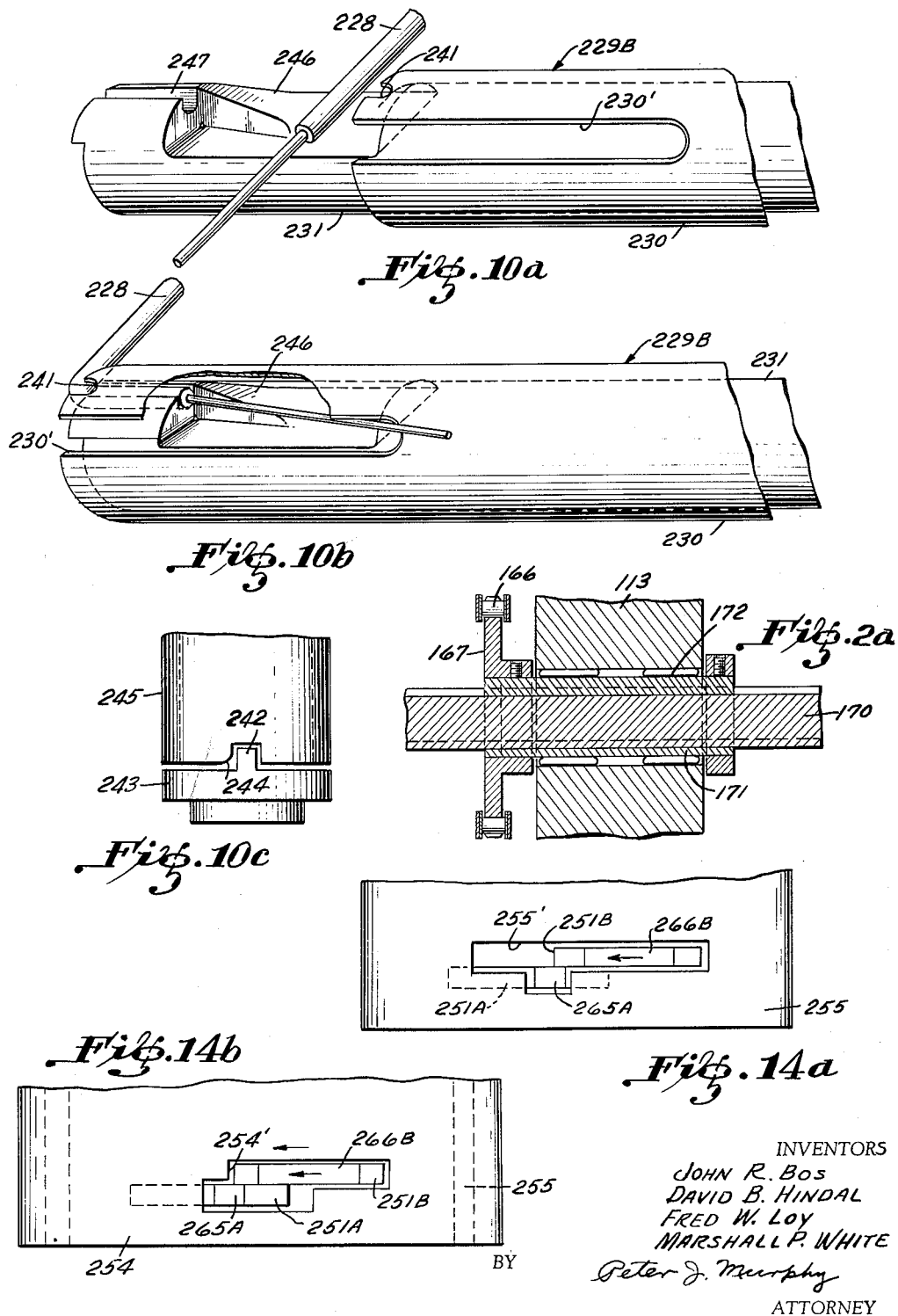

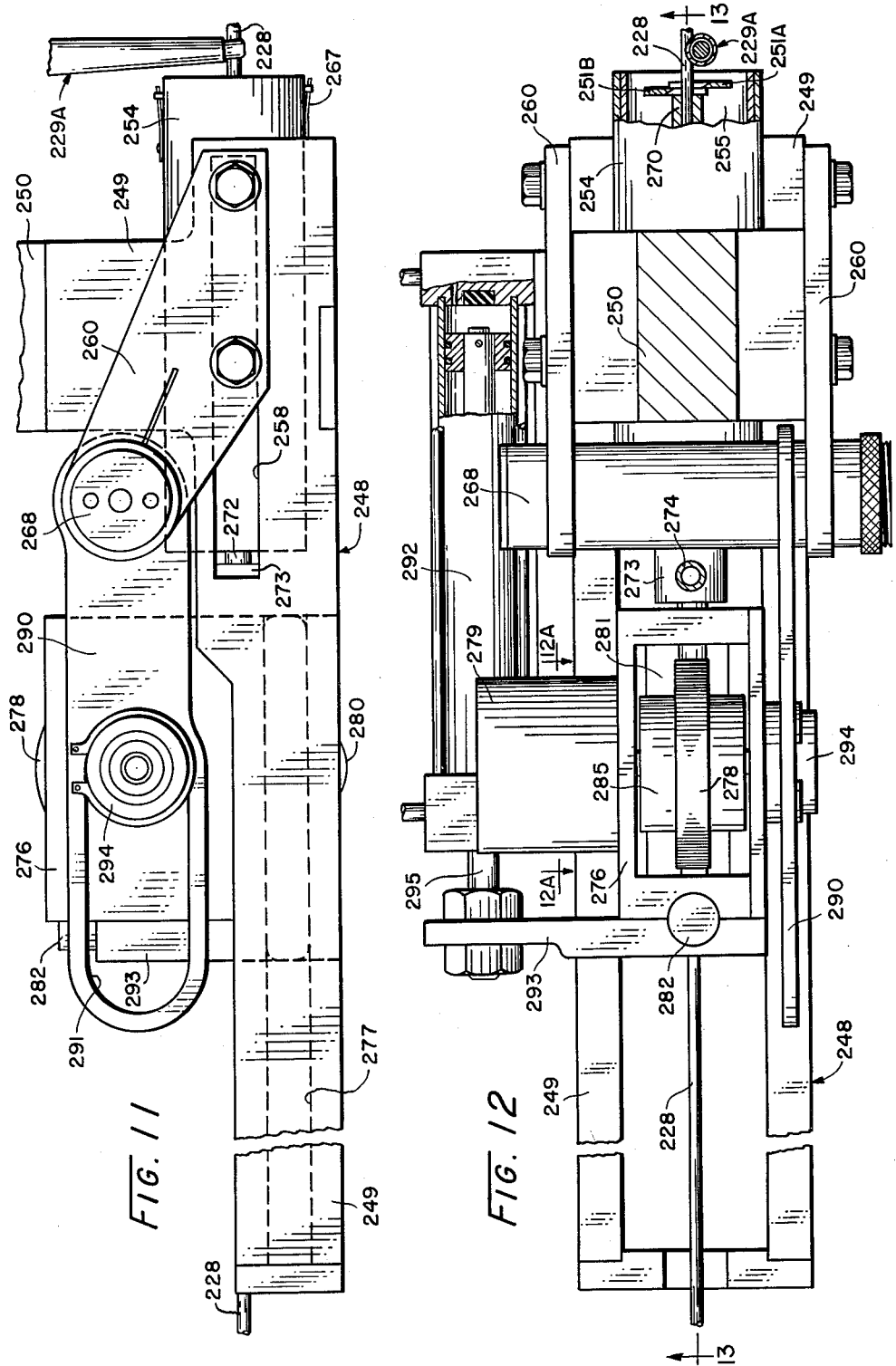

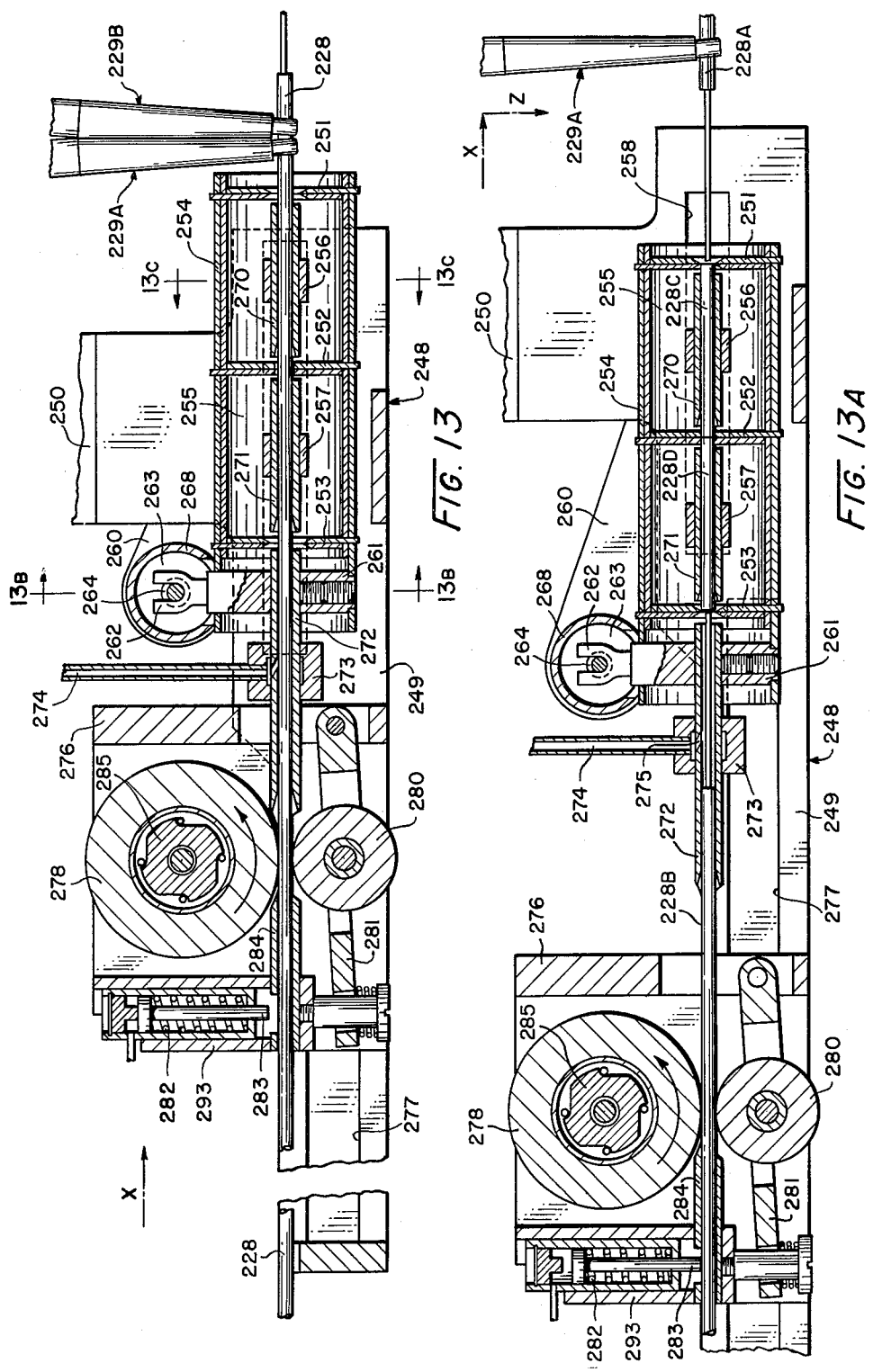

Sept. 17, 1963 J. R. BOS ETAL 3,103,735
POSITIONING APPARATUS
Filed April 6, 1959 23 Sheets-Sheet 13

JOHN R. BOS
DAVID B. HINDAL
FRED W. LOY
MARSHALL P. WHITE
INVENTORS

BY *Peter J. Murphy*

ATTORNEY

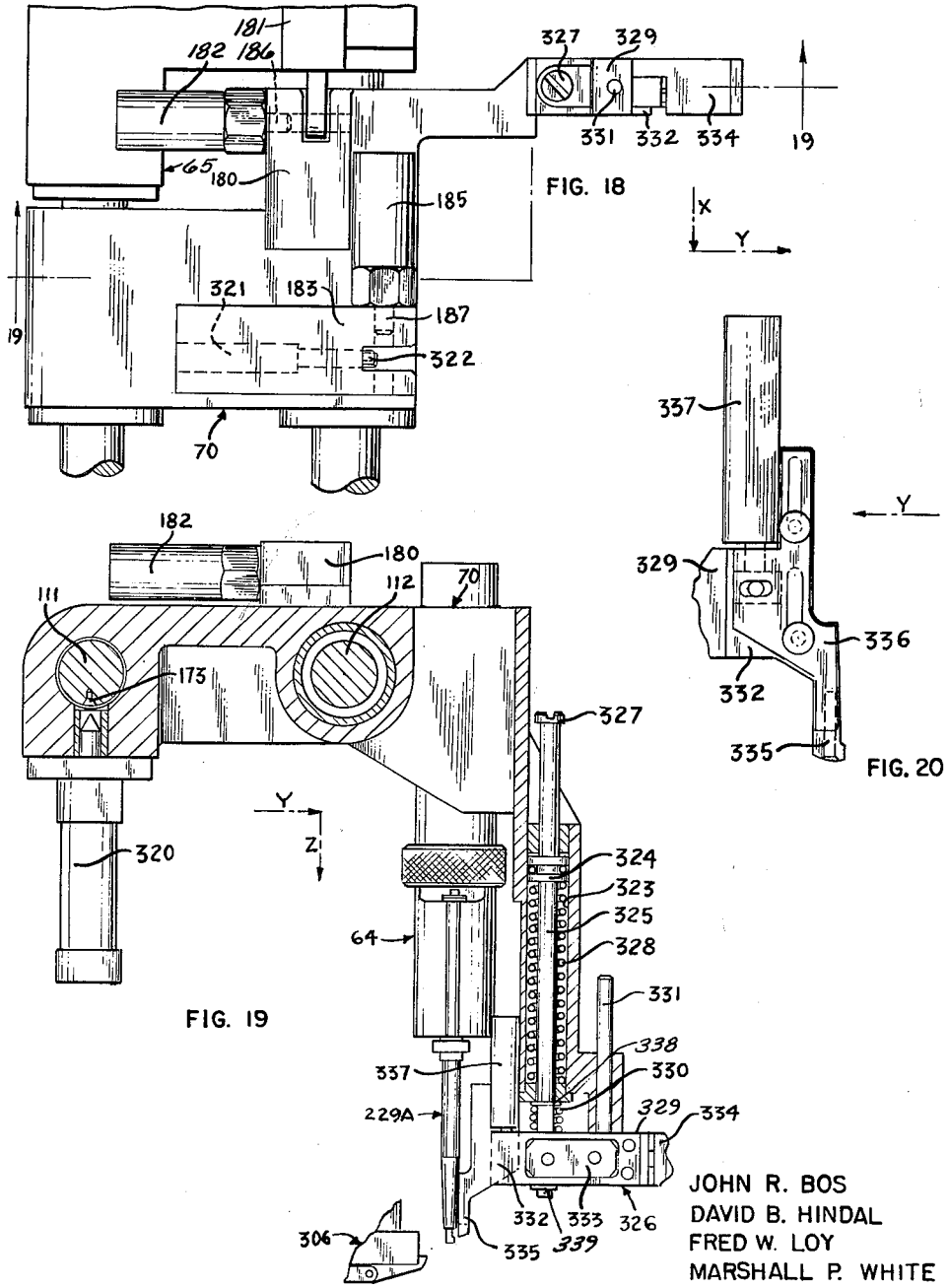

Sept. 17, 1963   J. R. BOS ETAL   3,103,735
POSITIONING APPARATUS
Filed April 6, 1959   23 Sheets-Sheet 20

Sept. 17, 1963 J. R. BOS ETAL 3,103,735
POSITIONING APPARATUS
Filed April 6, 1959 23 Sheets-Sheet 22

United States Patent Office 3,103,735
Patented Sept. 17, 1963

---

3,103,735
POSITIONING APPARATUS
John R. Bos, Grand Haven Township, Ottawa County, David B. Hindal, Spring Lake, Fred W. Loy, Fruitland Township, Muskegon County, and Marshall P. White, Grand Haven, Mich., assignors to Gardner-Denver Company, a corporation of Delaware
Filed Apr. 6, 1959, Ser. No. 804,327
8 Claims. (Cl. 29—33)

This invention relates to positioning apparatus and more particularly to apparatus for positioning and operating tools for connecting wires between pairs of terminals of electrical units mounted in an array.

In the connection of wires between terminals of electrical units, it is necessary to cut the wires to predetermined lengths, to strip the ends of insulated wires, and to connect the wires to selected terminals by suitable means, such as soldering. Tools have been developed for making solderless wrapped wire connections, of a wire to a terminal, eliminating the soldering operation. A manually operated tool of this type is described in Shaff U.S. Patent No. 2,732,139, issued January 24, 1956. In this tool, the stripped end of wire is loaded in a wrapping tool by insertion into an axial opening in the tool bit. An improved form of tool is described in Bos and Shulters U.S. Patent No. 2,884,685, issued March 5, 1959, for use with wrapping bits of a side loading type as are described in Bos and Shulters U.S. Patent No. 2,885,764, issued May 12, 1959. These bits are loaded by laying the wire transversely across a bit and the tool is then actuated to close the bit on the wire for the wrapping operation.

An object of this invention is to provide an improved apparatus for positioning tools.

Another object of this invention is to provide a novel apparatus for positioning a tool, providing for fast movement of a tool toward a stop position and slow movement of the tool prior to reaching the stop position to assure accurate positioning.

A further object of this invention is to provide a novel apparatus for positioning a tool including a position check means to indicate whether the tool has been correctly or incorrectly positioned.

A still further object of this invention is to provide an improved apparatus for positioning tools over terminals on a panel and for connecting a wire between the selected terminals, including control means for semiautomatically programming the positioning and the connecting operations.

A still further object of this invention is to provide a novel apparatus for indexing a panel supporting rotary table.

A still further object of this invention is to provide an improved apparatus for positioning tools over selected terminals in a panel, for guiding a wire on the panel, and for connecting a wire between the selected terminals, the apparatus including means for feeding completely prepared wire to the tools and cutting and stripping the wire to a proper length determined by the tool movements to the selected terminals.

To accomplish these objects there is provided apparatus including a frame upon which is mounted a panel supporting rotary index mechanism and a mechanism for supporting and positioning a pair of wire connecting tools in a plane parallel to the panel. A wire handling unit is associated with one of the tools for preparing wire and feeding wire to the tools. The tools are moved from the positioning plane to the panel to effect connection of the wire to the terminals. A control circuit provides for semiautomatic selection of a panel position and tool positions, and for automatic cycling of the wire connecting operation, the return of the tools to starting position, and the preparation and feeding of the wire.

A feature of this invention resides in the wire preparation unit associated with one of the tools for cutting a wire to length, for stripping both ends of the wire, and for feeding the wire to the tools.

Another feature of this invention resides in the mechanism for driving the tools including control means for slowing tool movement prior to reaching a selected stop position, for accurately stopping the tool, and for making a position check.

The novel features of the invention, as well as additional objects and advantages thereof, will be understood more fully from the following description when read in connection with the accompanying drawing, in which:

FIGURE 2a is a fragmentary sectional view taken along the line 2a—2a of FIGURE 2, looking in the direction of the appended arrows;

FIGURE 3 is a partial side view, partially in section, taken along the line 3—3 of FIGURE 1, looking in the direction of the appended arrows;

FIGURE 4 is a fragmentary view of the panel supporting mechanism taken along the line 4—4 of FIGURE 2, looking in the direction of the appended arrows;

FIGURE 5 is a sectional view of the B tool carriage taken along the line 5—5 of FIGURE 2, looking in the direction of the appended arrows;

FIGURE 6 is a fragmentary elevation view of the B tool carriage looking from the rear of the machine;

FIGURES 10a and 10b are fragmentary views of the wrapping bit;

FIGURE 10c is a fragmentary view of a portion of the wrapping tool;

FIGURE 11 is an elevation view of the wire preparation unit, looking from the front of the machine;

FIGURE 12 is a top view of the wire preparation unit partially broken away;

Figure 13B:
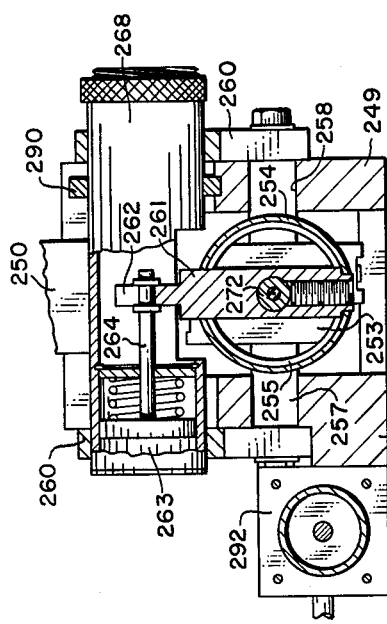
FIGURE 13 is a sectional view taken along the line
Figure 13C:
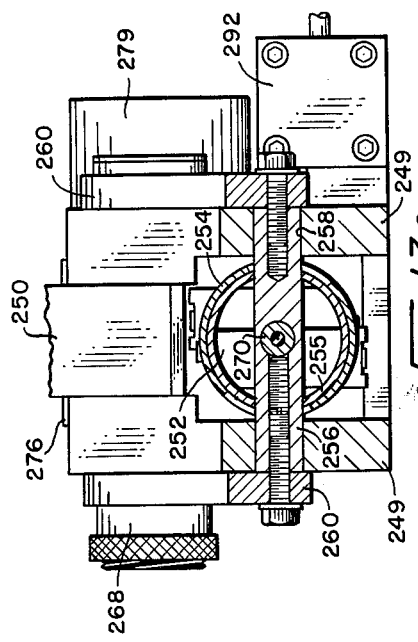
Figure 14:
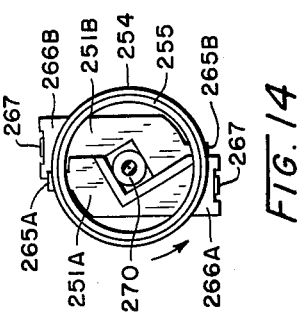
Figure 4A:
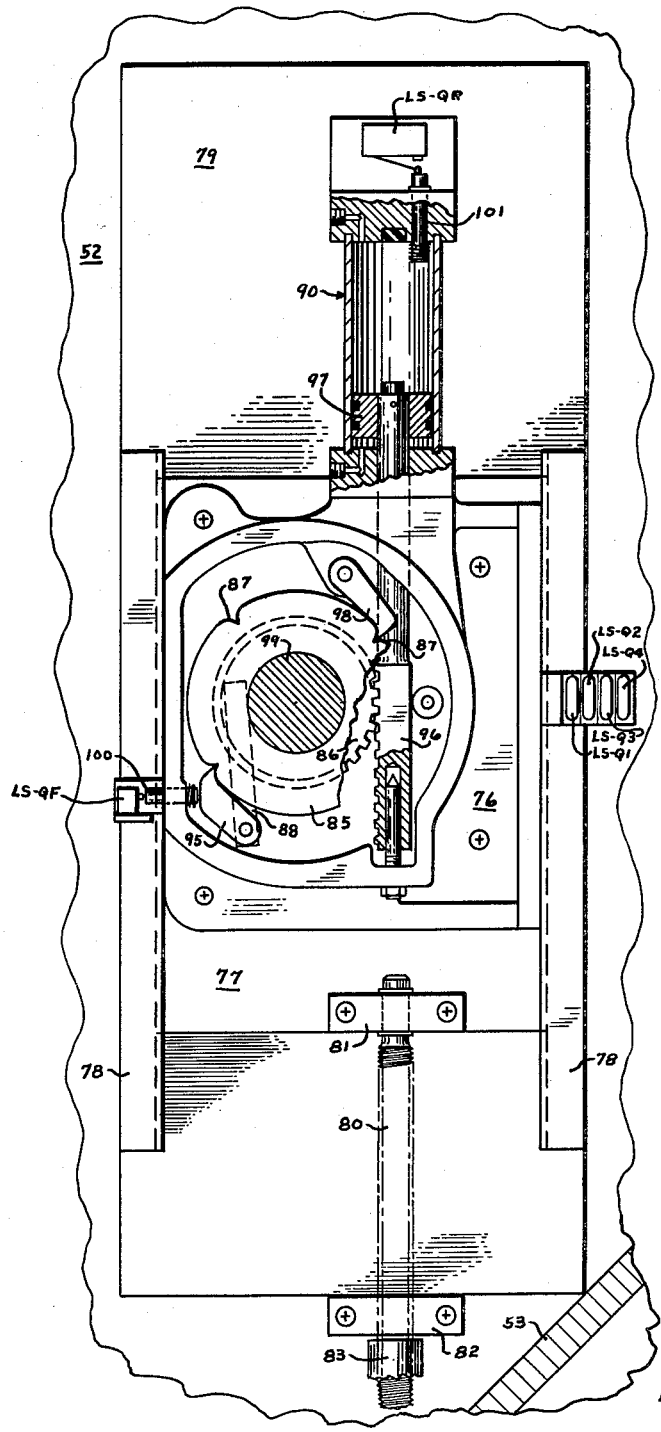
FIGURE 4a is a view taken along the line 4a—4a of FIGURE 4, looking in the direction of the appended arrows, and showing details of the indexing fixture.
Figure 15:
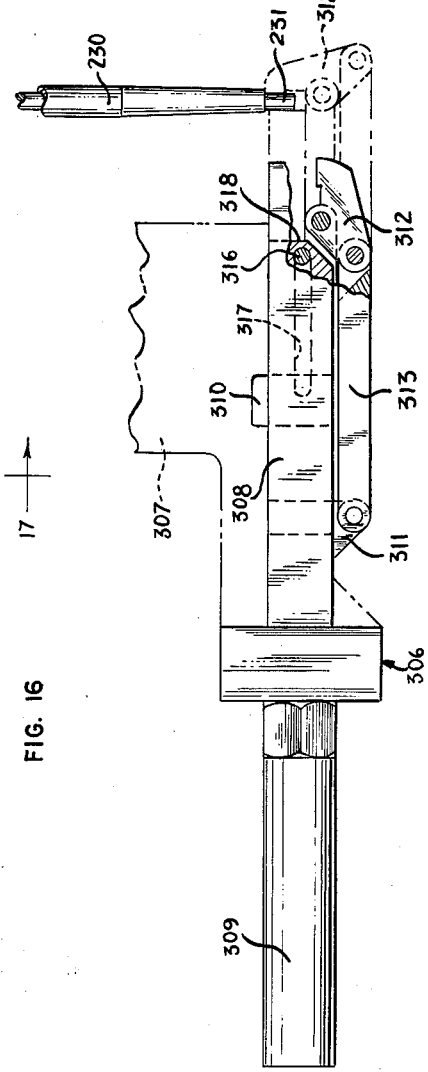
Figure 16:
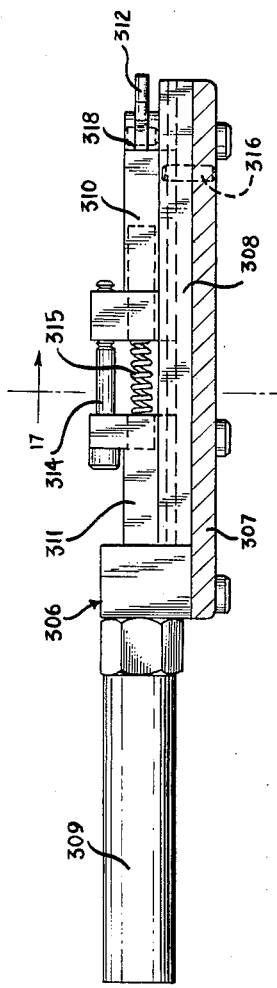
Figure 17:
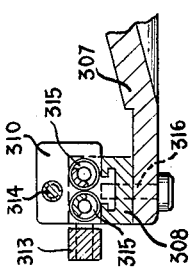
Figure 36:
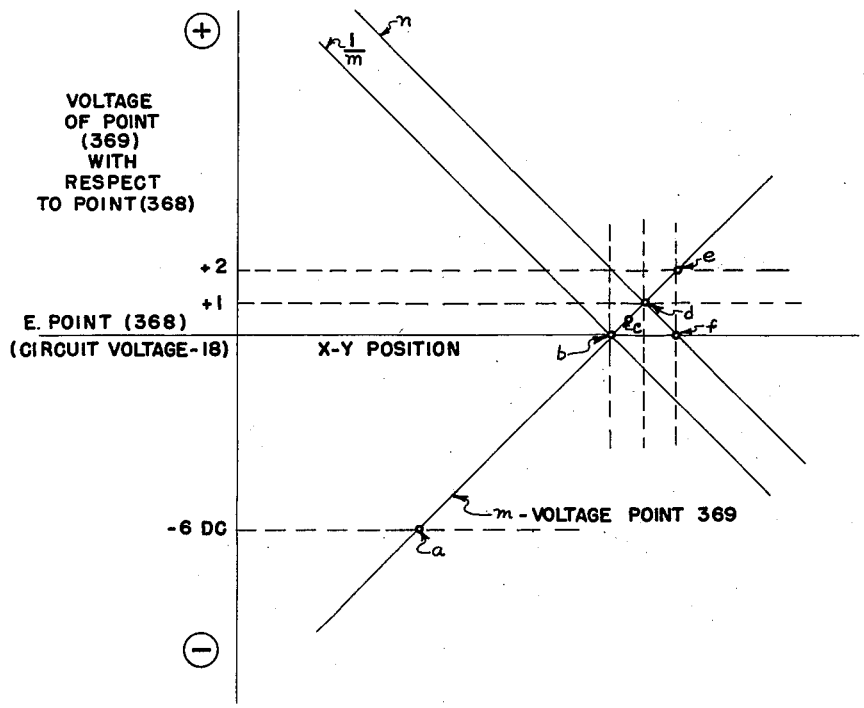

13—13 of FIGURE 12, looking in the direction of the appended arrows;

FIGURE 13a is a view similar to FIGURE 13 showing the parts of the wire preparation unit in different operative positions;

FIGURE 13b is a sectional view taken along the line 13b—13b of FIGURE 13, looking in the direction of the appended arrows;

FIGURE 13c is a sectional view taken along the line 13c—13c of FIGURE 13, looking in the direction of the appended arrows;

FIGURES 14, 14a and 14b are fragmentary views of the wire preparation unit sleeve assembly;

FIGURE 15 is an elevation view of the A tool gripper assembly, looking from the right side of the machine;

FIGURE 16 is a top view of the tool gripper assembly;

FIGURE 17 is a sectional view taken along the line 17—17 of FIGURE 16, looking in the direction of the appended arrows;

FIGURE 18 is a top view of the dressing finger carriage;

FIGURE 19 is an elevation view partially in section, the section taken along the line 19—19 of FIGURE 18, looking in the direction of the appended arrows;

FIGURE 20 is a fragmentary view of the dressing finger assembly;

FIGURES 21 to 35 and 37 are schematic diagrams of the operating circuit for the machine; and FIGURE 36 is a curve illustrating operation of the detector circuit.

Figure 1:
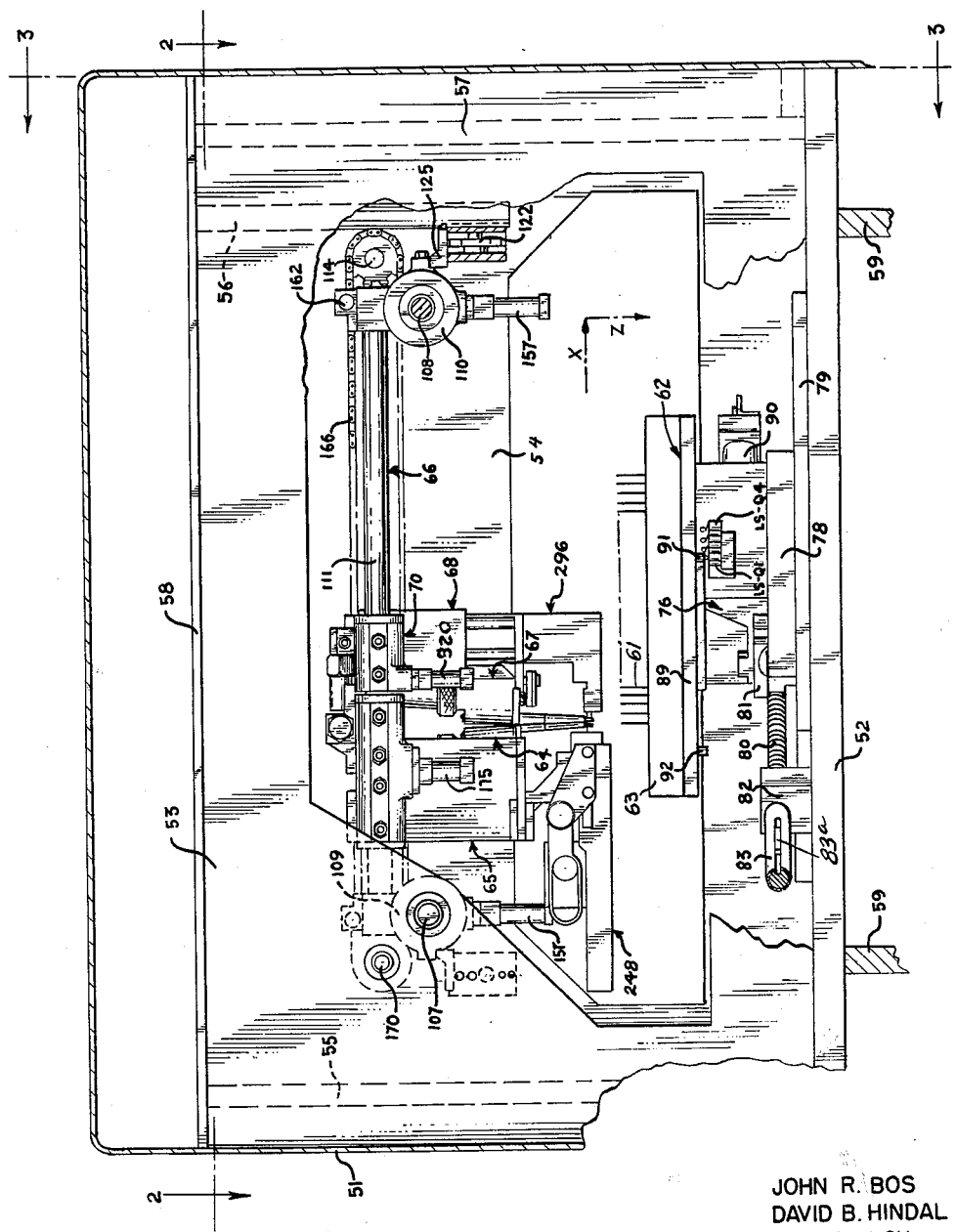
FIGURE 1 is a front elevation of a preferred form of wiring machine, with portions of the cabinet and supporting frame broken away.

The wiring machine to be described has for its purpose the connecting of wires between pairs of terminals in a wiring panel, by means of wrapped wire connections. A wiring panel, for purposes of the following description, may comprise a single electrical unit or a plurality of electrical units supported in a planar array and having perpendicularly extending terminals arranged in a co-ordinate system, such as 2/10 inch grid. A panel 63 is shown in FIGURE 1 mounted horizontally on a suitable supporting and indexing mechanism which will be referred to, generally, as an index table 62. The panel is mounted and indexed to present rows of terminals aligned parallel with the front of the machine ($x$ rows) and rows of terminals aligned perpendicular to the first named rows ($y$ rows).

The wrapped connections are made by two wrapping tools which will be referred to as the A tool and the B tool. A dressing finger cooperates with the tools to form the wiring patterns. These tools have "home" positions located adjacent the left-front corner of the machine and adjacent to the front-left front corner of the panel, and move away from the home positions in a positioning plane parallel to that of the panel. Movement of the tools in a direction parallel to the front of the machine will be termed X motion (AX and BX motion for the A and B tools respectively) or movement in an X direction. Movement of the tools from front to rear of the machine and return will be termed Y motion (AY and BY motion for the A and B tools respectively) or movement in a Y direction. The terminal on the panel nearest the home position of the tools will lie in the $x$–1, $y$–1 coordinate and all terminals in the panel will have corresponding $x$, $y$ coordinates. The tools are positioned by the machine in selected $x$, $y$ coordinate positions over the terminals to be connected. Movement of a tool from one $x$ or $y$ coordinate position to an adjacent $x$ or $y$ coordinate position is one module of movement. The directions of X and Y motion are shown in the several figures of the drawings by means of phantom arrows. These arrows indicate the directions of X and Y motion away from the home position to selected positions in the positioning plane over the panel. When the tools are returned to the home position, the respective X and Y motions are in the opposite directions.

Figure 2:
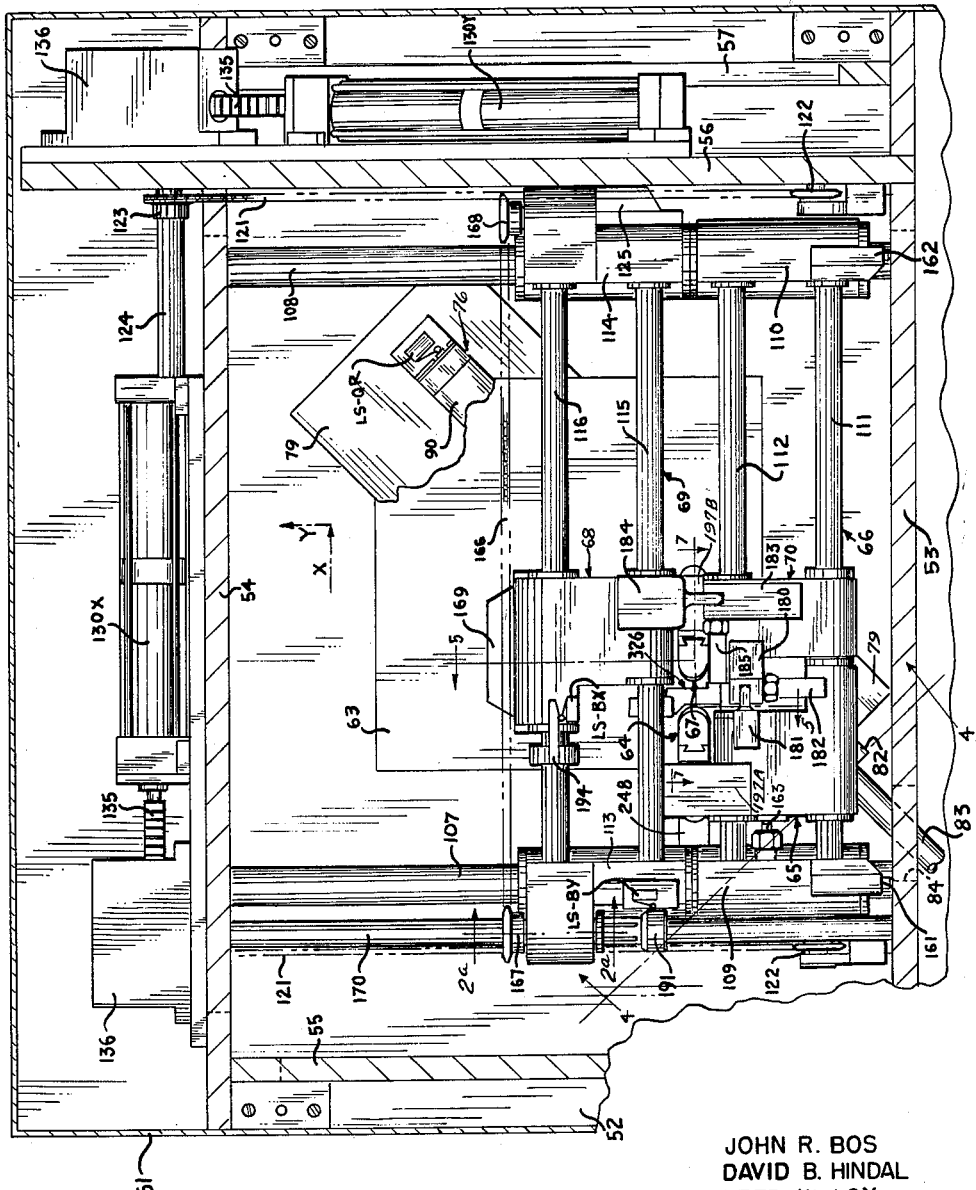
FIGURE 2 is a top view of the machine of FIGURE 1 taken along the line 2—2 of FIGURE 1, looking in the direction of the appended arrows.
Figure 2B:
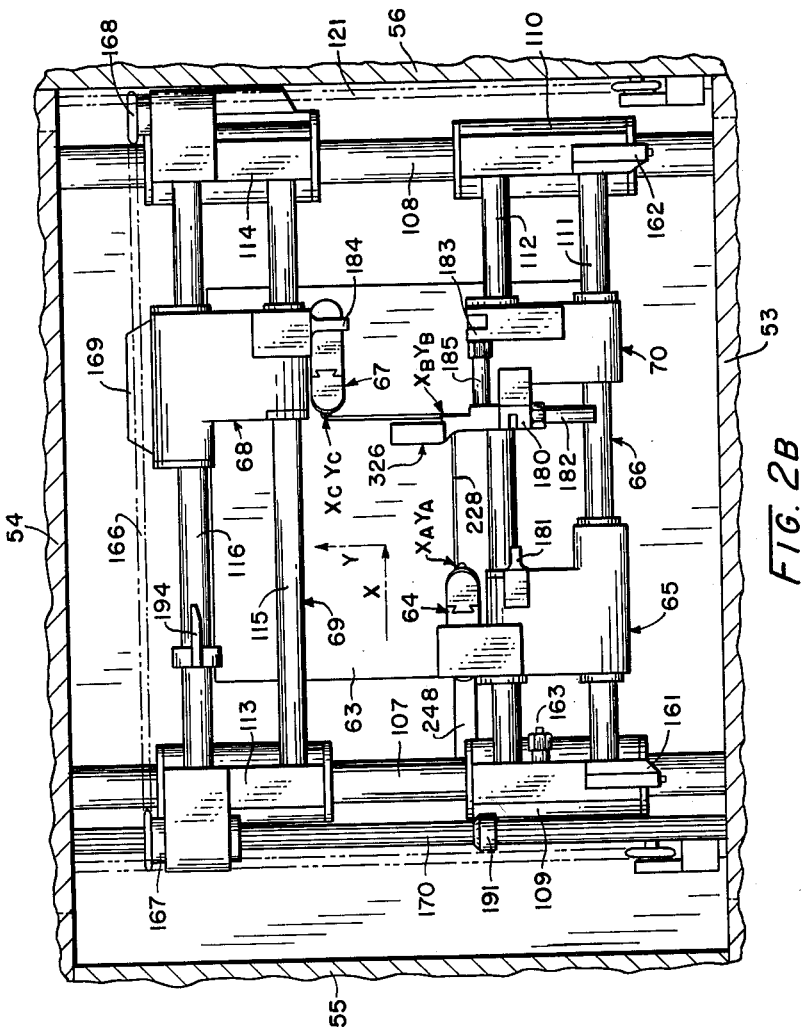
FIGURE 2b is a fragmentary view similar to FIGURE 2, showing the carriers and carriages moved from the positions shown in FIGURE 2.
Figure 2C:
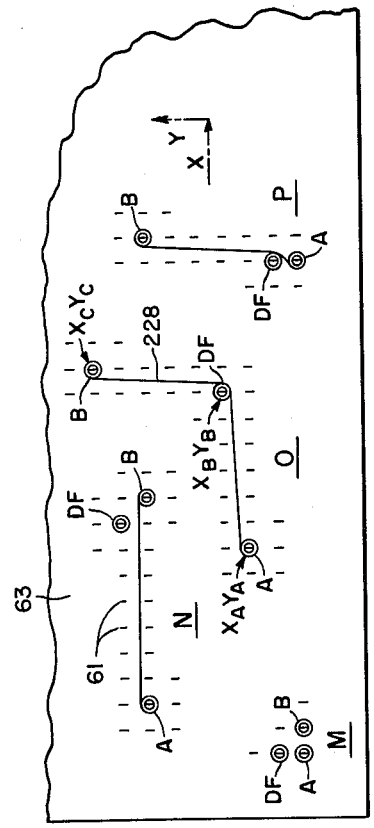
FIGURE 2c is a fragmentary plan view of a wiring panel diagrammatically showing the several wiring patterns which may be made by the machine.

FIGURE 2c is a fragmentary plan view of a wiring panel 63 showing terminals 61 arranged in a rectangular grid and diagramatically showing the wiring patterns and the means for forming the patterns. In this figure, the A tool is identified by the letter A, the B tool by the letter B, and the dressing finger by the letters DF. Pattern M shows the relative positions of the tools and the dressing finger in the home positions. In these positions, the A tool lies over terminal X1, Y1, for example; the B tool lies over an adjacent terminal in the X direction, X2, Y1, and the dressing finger lies over an adjacent terminal in the Y direction, X1, Y2.

To produce any wire pattern, the leading end of a length of wire is gripped by the B tool, which makes the connection farther from the home position, and is pulled by the B tool relative to A tool. When the wiring pattern is formed, the wire is gripped at the A tool and severed adjacent thereto. Pattern O is an L-shaped pattern. To produce this pattern, the A tool is first moved in both X and Y directions to a position over a selected terminal Xa, Ya. During these movements, the B tool and dressing finger move with the A tool in the same relative positions shown in pattern M. The B tool and the dressing finger are then moved in an X direction to position the dressing finger over a selected terminal Xb, Yb. The B tool is then moved in a Y direction to a position over a selected terminal Xc, Yc, the dressing finger forming the corner of the L-shaped pattern for a wire 228. In the formation of this or any other wiring pattern, the dressing finger moves only in an X direction relative to the A tool; the separation between the dressing finger and the A tool in a Y direction remaining fixed at one module. The B tool moves only in the Y direction relative to the dressing finger; the separation between the B tool and the dressing finger in the X direction remaining fixed at one module.

Patterns N and P, of FIGURE 2c, illustrate the two other wiring patterns which may be made by the machine to be described in accordance with the above described relationships. To produce pattern N, the B tool is moved in the X direction relative to the A tool; the dressing finger moving with the B tool but serving no function. To produce pattern P, the B tool is moved in a Y direction relative to the A tool; the dressing finger guiding the wire between the rows of terminals.

Referring to FIGURE 2, the above discussed A and B tools are carried by carriages 65 and 68, respectively, and the dressing finger is carried by a carriage 70. These carriages are clustered in the home position to position the A tool 64, the B tool 67 and the dressing finger (326) in the above mentioned home positions illustrated in pattern M of FIGURE 2c. FIGURE 2b shows the carriages 65, 68 and 70 moved away from the home positions to produce an L-shaped wiring pattern as shown in pattern O of FIGURE 2c; the pattern being formed by the tools and dressing finger as described.

The tools and the dressing finger are also moved vertically, from the positioning plane, over the terminals to make the wrapped connections and this will be termed Z motion or movement in a Z direction. The terminals may have sufficient height for the wrapping of two wires on a single terminal, i.e., two separate connections. The tools are moved to a Z–1 position for making the lower connection on the terminal or to a Z–2 position for making the upper connection. When the tools are moved in the Z direction for the wrapping operation, the wire is laid between the rows of terminals as shown in FIGURE 2c. Phantom arrows on the drawings indicate the direction of Z motion toward the wiring panel.

Referring now particularly to FIGURES 1, 2 and 3 of the accompanying drawing, a preferred embodiment of a machine according to this invention comprises, generally, an enclosing and supporting cabinet 51 and a frame which supports the moving parts of the machine consisting of a horizontal base plate 52, a front plate 53, a rear plate 54, and side plates 55, 56 and 57. An upper plate 58 is supported by the above mentioned plates. The base plate 52 may be supported by suitable frame members 59. An index table 62, mounted on the base plate 52, supports a wiring panel 63 in a horizontal plane.

As best shown in FIGURES 2 and 2b, the mechanism for positioning the A and B tools above the index table includes an A carrier 66 and a B carrier 69 mounted for Y motion. An A carriage 65 and a B carriage 68 are mounted, respectively, on the A and B carriers for X motion. The A tool 64 and the B tool 67 are mounted, respectively, on the A and B carriages for Z motion with respect to the carriages. A dressing finger carriage 70, hereafter referred to as the DF carriage, is also mounted for X motion on the A carrier and serves to interlock the A and B carriages and carriers, as will be described. In the drawings, except in FIGURE 2b, the A and B tools are shown in their home position, hence the above mentioned carriages and carriers are also shown in their home positions.

All of the mechanical functions of the machine are accomplished through compressed air operated devices such as extensible power devices, cylinder units, and air motors; these devices being described in the following detailed description of the machine. Extensible power devices are cylinder and piston assemblies which impart rectilinear motion to a machine element. Some of these extensible power devices are built into the several components of the machine; and other such devices, which are unitary attachments, are referred to as cylinder units. All of these devices are controlled by means of suitable air valves which control the flow of air to and from the devices. The valves are connected to a suitable source of compressed air.

References are made to single acting cylinder units. A single acting cylinder unit is understood to comprise the combination of a cylinder and piston, the piston having a stem or plunger for performing a mechanical function. Means is provided for directing air to one face of the piston, to shift the piston in one direction, and the unit may include an internal spring for shifting the piston in the other direction, if an external spring is not provided. Units of this type are generally controlled by a three-way valve which is understood to be a valve for alternatively directing air to the unit and venting the unit.

Other references are made to double acting cylinder units. A double acting cylinder unit is understood to comprise the combination of a cylinder and a piston, the piston having a stem or plunger for performing a mechanical function. Means are provided for directing air to both faces of the piston for shifting the piston in either direction. Units of this type are generally controlled by a four-way valve which is understood to be a valve for alternatively directing air to one face of the piston while venting air from the other face of the piston and directing air to the other face while venting air from the one face.

The sequence of machine operations is preferably controlled by an electric control circuit; therefore, many of the valves may be solenoid actuated valves operative in response to an electric signal. Portions of an electric control circuit are described hereafter.

*Index Table*

The index table, shown particularly in FIGURES 1, 2, 4 and 4a, includes an indexing fixture 76 mounted on a gib slide 77 which is retained within gibs 78 fixed to an elongated mounting plate 79. The mounting plate is fixed to the base plate 52. The gibs are disposed at an angle of 45° with respect to the front of the machine and with respect to the directions for X and Y motion.

A lead screw 80 is rotatably mounted at its rearward end in a thrust bearing 81, which is mounted on the forward end of the gib slide 77.

The forward end of the lead screw engages and extends through a nut 82 fixed to the base plate 52 adjacent the forward end of the mounting plate 79. A hollow shaft 83 is coupled to, and supported by, the forward end of the lead screw 80 by means of a key connection 83a so that the lead screw may be rotated by the shaft while axial movement of the lead screw with respect to the shaft is permitted. The shaft 83 extends through a slot 84 in the front plate 53 and is supported adjacent its forward end by means (not shown) which permit rotation of the shaft and prevent axial movement thereof. The forward end of the shaft may be provided with a square for the purpose of attaching a crank whereby the gib slide may be moved within the gibs.

The indexing fixture 76 includes an index plate 85 rotatably mounted coaxially with respect to a gear 86 which is, in turn, rotatably mounted on the fixture. The index plate is provided with four, equally spaced, circumferential notches 87. An arm 88, fixed to the gear 86, carries pivotally mounted pawl 95 which is suitably biased to engage the notches 87 of the index plate 85. The gear 86 is oscillated by a rack 96, fixed to a piston 97 of a double acting air cylinder unit 90. The rack is suitably guided for rectilinear movement, in engagement with the gear 86.

The rack 96 drives the index plate 85 clockwise (as viewed in FIGURE 4a) in angular increments of 90°. A pivotally mounted anti-backup pawl 98, biased into engagement with the index plate notches 87, prevents counterclockwise rotation of the index plate 85. A fixture plate 89, upon which the wiring panel 63 is mounted, is secured to an upwardly extending boss 99 of the index plate 85, and is rotated with the index plate.

The fixture plate has four pins 91–94 extending downward. These pins are disposed on radii spaced 90° apart and each at a different radius from the center of rotation of the fixture plate. Four normally closed limit switches LS–Q1, LS–Q2, LS–Q3 and LS–Q4 are mounted on the indexing fixture 76 and aligned on a radius so that each switch is opened by a respective pin (91–94) when the fixture plate is indexed in a respective quadrant position. The rack is in a forward position (shown in FIGURE 4a) when the feed table is indexed and is driven through a full cycle (rearward and forward) to rotate the index plate 90°. A normally open limit switch LS–QF is mounted to be closed by the pawl 95, through a pin 100, when the fixture plate is indexed any one quadrant position; and a normally closed limit switch LS–QR is mounted on the cylinder unit 90 to be actuated by the piston 97, through a pin 101, at the limit of its rearward motion. The operation of the indexing fixture is controlled by the above described limit switches and will be described in connection with the circuit and operation of the machine.

The indexing fixture is provided for the purpose of controlling the placement of the wiring pattern on the panel, and thereby to control the density of wires laid between rows of terminals. Hundreds of connections may be made on a single wiring panel; hence, a multiplicity of wires laid between adjacent rows of terminals or a multiplicity of crossed wires at a given point on the panel may result in such congestion of wires as to impair the making of additional wire connections. Since the direction of X and Y tool motion are relative to the panel, as fixed in the machine, additional pattern control may be had by rotating the panel relative to the machine to thereby change the directions of X and Y motion relative to the panel. The screw feed adjustment is provided for moving the center of rotation of the fixture plate and panel nearer to or further from the home position of the wrapping tools, in a direction 45° to the direction of X and Y movements. By moving the center of rotation of a small panel nearer to the home position, the tools do not have to move so far to wire a smaller panel. The above described indexing and adjustment of the feed table must be accomplished prior to the Z motion of the tools toward the panel.

Tool Positioning Mechanism

As best shown in FIGURES 1, 2, 2b and 3, the A and B carriers 66 and 69 are mounted on slide rods 107 and 108 which extend between the front and rear plates 53 and 54 on either side of the frame. The A carrier is mounted toward the front of the machine and includes end housings 109 and 110 which contain bearings engaging the slide rods 107 and 108. Parallel slide rods 111 and 112 extend between the end housings 109 and 110. The B carrier, mounted behind the A carrier, is similar in structure and includes end housings 113 and 114 and slide rods 115 and 116.

Y motion is imparted to the B carrier by chains 121 which pass over idler sprockets 122, mounted on the front plate 53, and sprockets 123 fixed to a horizontal drive shaft 124 rotatably mounted on the rear plate 54 and the side plate 56. The mountings for the idler sprockets 122 are adjustable to control chain tension. One of the chains 121 is clamped to each of the end housings 113 and 114 at brackets 125. These brackets are adjustable to provide for timing of the machine. The A carrier does not have an independent driving means, but is moved by the B carrier through the DF carriage in a manner to be described.

Referring now particularly to FIGURE 3, the drive mechanism for the B carrier includes an air-hydraulic cylinder unit 130Y, hereafter referred to as the Y-drive cylinder, mounted on the side plate 56 and having an air drive chamber 131 and a hydraulic control chamber 132. Pistons 133 and 134, for the drive and control chambers respectively are fixed to a common piston rod having a rack 135 fixed to its end which extends through the forward end of the cylinder. The pistons and the rack are shown in rearward or reverse position in which the carriages and carriers are held in their home positions. The drive shaft 124 extends through the side plate 56 and into a gear housing 136 associated with the Y-drive cylinder. A stub shaft 137 is rotatably mounted in the housing 136 and pinions 138 and 139 are keyed to this shaft. The rack 135 meshes with the pinion 138 and is backed up by a roller on the drive shaft 124. The pinion 139 meshes with a pinion 141 keyed to the drive shaft whereby the drive shaft is driven by the rack 135. A toothed wheel or sprag 142 is keyed to the drive shaft and a pawl 143, actuated by a double acting air cylinder unit 146, is mounted for engagement with the sprag. The cylinder unit 146 is controlled by a solenoid actuated four-way valve YS. A gear 144, fixed to the sprag 142, drives a potentiometer 145Y which, in cooperation with an electric control circuit, controls the operation of the solenoid actuated valve YS; hence, controls the operation of the pawl 143 through the cylinder unit 146. The sprag and pawl stop the Y motion of the A and B carriers when a selected wiring or stop position is reached. The stop positions may be selected by means of a bridge circuit, for example, which is part of the electric control circuit for the machine. The voltage impressed across one side of the bridge circuit may be determined by program switches which may be actuated selectively by an operator, for example. The other side of the bridge circuit may comprise the potentiometer 145Y. When the bridge is balanced by the potentiometer, which is driven by the Y drive mechanism, an electric signal actuates the solenoid valve YS which controls the cylinder unit 146 and the pawl 143 to stop the Y motion at the desired wiring or stopped position.

To control the feed rate of the Y-drive cylinder, the ends of the control chamber 132 are connected by parallel bypass passages 150 and 151, shown diagrammatically, which bypass the piston 134. The passage 150 includes an adjustable flow orifice 152 and a two-way valve 153 actuated by solenoid YD. The line 151 includes an adjustable flow orifice 154. When the valve 153 is open, fluid flows through both orifices 152 and 154 to provide for fast movement of the piston, hence high speed of the B carrier. When the valve 153 is closed, fluid passes only through the orifice 154 to provide for slow movement of the piston, hence low speed of the B carrier. This will be discussed further in connection with the operation of the machine. The Y drive cylinder and the above described mechanism will be referred to as the Y drive mechanism.

The above described sprag and pawl mechanism provide for stopping the carriers at selected positions which may be at increments of movement spaced at 2/10 of an inch. Since the accuracy of the sprag and pawl mechanism is limited by mechanical backlash, and since the terminals are received within the tool bits 229A and 229B and within the dressing finger, more accurate positioning of the carriers is desired. To this end, the slide rods 107 and 108 are provided with holes 156 extending upward from undersurface of the rods and provided with a 60° taper. Single acting air cylinder units 157 and 158 mounted respectively on the end housings of the A and B carriers control mating taper pins which extend into the taper holes to accurately position the carriers and to positively lock the carriers in their selected positions relative to the slide rods 107 and 108. These pins are spring biased into engagement with the holes and are disengaged from the holes by means of the air cylinder units. Cylinder unit 157 is controlled by a three-way solenoid actuated valve PA and cylinder unit 158 is controlled by a three-way solenoid actuated valve PB.

Buffers 161 and 162 are mounted respectively on the end housings 109 and 110 of the A carrier to engage the front plate 53. These are desirable since the A carrier rides free in its movement toward the front plate and is merely pushed by the B carrier.

The A tool carriage 65 comprises a housing containing bearings engaging the slide rods 111 and 112 of the A carrier. A buffer 163 is mounted on the end housing 109 of the A carrier to be engaged by the A carriage when it is moved to its home position. The B carriage 68 comprises a housing containing bearings engaging the slide rods 115 and 116 of the B carrier. The A and B carriages are essentially identical in structure except that different operating components are mounted on the two carriages. The B carriage is moved in an X direction by a chain 166 passing over a driven sprocket 167 and an idler sprocket 168 rotatably mounted respectively on the end housings 113 and 114 of the B carrier. The chain is secured to a bracket 169 adjustably mounted on the B carriage for timing of the machine. The driven sprocket 167 is fixed to a hollow shaft 171 rotatably, by means of bearings 172, in the B carrier end housing 113, the hollow shaft having an internal spline for engagement with a spline shaft 170 rotatably mounted in the front and rear plates 53 and 54 and extending through the rear plate. The spline shaft drives the B carriage with respect to the B carrier while movement of the B carrier is permitted with respect to the spline shaft. The spline shaft is driven and positioned by an X drive mechanism including an X drive cylinder 130X, mounted on the rear plate 54, identical in structure and operation to the Y drive mechanism and Y drive cylinder.

The slide rods 111 of the A carrier and 116 of the B carrier are provided respectively with taper holes 173 and 174 similar to the holes 156 in the slide rods 107 and 108. The A carriage is provided with a single acting air cylinder unit 175 and the B carriage is provided with a single acting air cylinder unit 176 respectively actuating taper pins to engage the pins with the holes in the respective slide rods. Cylinder unit 175 is controlled by solenoid actuated valve PA and cylinder unit 176 is controlled by solenoid actuated valve PB.

Drive mechanisms have been described for positively moving the B carrier and B carriage in their respective motions. The A carrier and A carriage are driven through the B carrier and B carriage by means of an interlock system associated with the A and B carriages and with the DF carriage 70. The DF carriage, as best shown in FIGURES 2, 2b, 18 and 19, comprises a housing enclosing bearings engaging the slide rods 111 and 112 of the A carrier. A fork member 180 mounted on the DF carriage receivers a finger 181 mounted on the A carriage and extending toward the DF carriage. A double acting air cylinder unit 182 mounted on the member 180 actuates a shot pin 186 which passes through aligned holes in the fork member and the finger to lock the A and DF carriages together. This mechanism will be referred to as the A carriage interlock. A second fork member 183 is mounted on the DF carriage to receive a finger 184 mounted on the B carriage and extending toward the DF carriage. A double acting air cylinder unit 185 mounted on the member 183 controls a shot pin 187 which passes through aligned holes in the member 183 and finger 184 to lock the B and DF carriages together. This mechanism will be referred to as the B carriage interlock. Both of the cylinder units 182 and 185 are controlled by a solenoid actuated four-way valve C. It will be seen that when the three carriages are interlocked the B carrier drive mechanism will drive the A carrier and the B carriage drive mechanism will drive the A carriage.

A normally open limit switch LS-BY mounted on the B carrier end housing 113 is engaged and closed by a cam 191, mounted on the spline shaft 170, when the B carrier is in its home position. A normally open limit switch LS-BX is mounted on the B carriage to be closed by a finger 194 mounted on the B carrier slide rod 116 when the B carriage is in its home position.

The B carriage is particularly shown in FIGURES 2, 5, 6 and 7. The B carriage 68 includes a tool holder 196 (FIG. 7) comprising a housing enclosing bearings engaging a pair of vertical guide rods 198, mounted between a bracket 197 and a foot plate 205 of the carriage, and a dove tail clamp 199 for rigidly clamping the B tool. Limited vertical movement of the tool holder and tool is permitted by this mounting. A vertical cylinder chamber 202 (FIG. 5), in the B carriage, contains a piston 203 fixed to a piston rod 204 extending through the carriage bottom plate 205. A transverse foot member 206, fixed to the piston rod 204, provides a rest plate for supporting the B tool and the tool holder to which it is clamped. A coil spring 207 contained within the cylinder chamber 202 biases the piston 204 to its uppermost position thereby holding the B tool in its uppermost positions. Air admitted to the cylinder chamber above the piston moves the piston and tool downward to provide the Z motion for the B tool. Air admitted to this chamber, and to a corresponding chamber in the A carriage, is controlled by a solenoid actuated three-way valve H.

A headed bolt 210, threaded into the foot member 206 and extends upward through a hole in the bottom plate 205. When the foot is moved downward by the piston 203, the bottom plate 205 is engaged by the head of the bolt 210 to fix the lowermost or Z-1 position of the B tool. A single acting air cylinder unit 211, mounted on the bottom plate 205, actuates a fork slide 212 within a guide 213 to enclose the bolt shank and be engaged by the bolt head to limit downward movement of the foot 206. The slide 212 is biased out of engagement with the bolt and is moved into engagement with the bolt by the air cylinder unit 211 to fix the Z-2 position of the B tool. Two normally open limit switches LS-BZ1 and LS-BZ2, mounted on the B carriage, are closed by a cam 216 associated with the tool holder 196 in respective Z-1 and Z-2 positions of the B tool. The A carriage and its associated tool holder have the same structure as that described above and corresponding limit switches LS-AZ1 and LS-AZ2. Portions of the A carriage are shown in some of the figures with corresponding parts being identified by the subscript A.

Wire Connecting Tool

Figures 10, 12A:
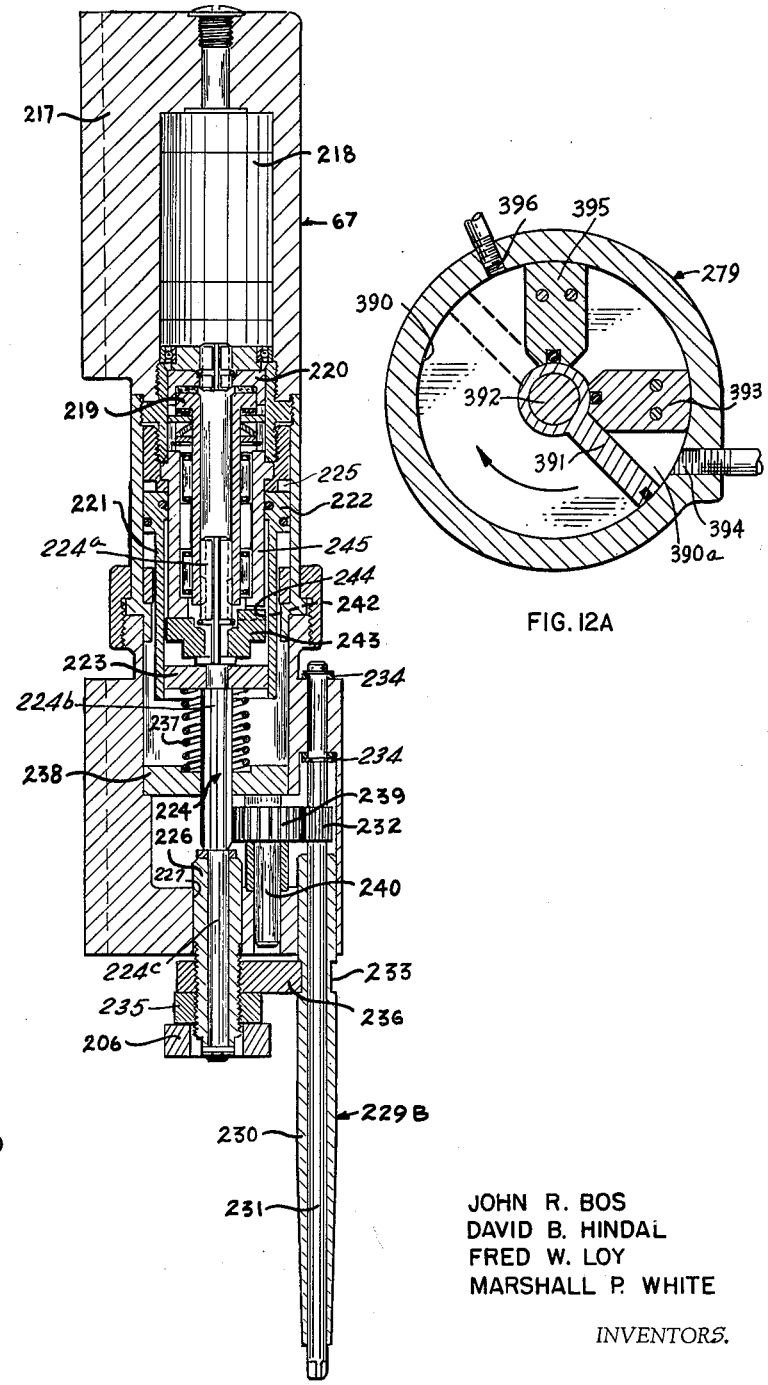
FIGURE 10 is a sectional view of the B tool taken along the line 10—10 of FIGURE 5 looking in the direction of the appended arrows.
FIGURE 12a is a sectional view taken along the line 12A—12A of FIGURE 12, looking in the direction of the appended arrows.

FIGURE 10 shows a sectional view of the B wrapping tool which is, in many respects, identical in structure and operation to the tool described fully in the above mentioned U.S. Patent 2,884,685. In the tool of FIGURE 10 the bit is offset to permit the bits of two adjacent tools to lie adjacent each other. The tool of the above mentioned application is a hand tool having manually controlled valves. The tool of FIGURE 10 is controlled through the machine control system. The A and B tools are identical in structure except that the respective bits are driven in opposite directions of rotation to maintain tension on the wire during wrapping.

Referring now to FIGURE 10, the tool comprises a generally cylindrical, elongated housing having a longitudinal dove tail 217, in two aligned sections, for engagement with the dove tail clamp 199 of the tool holder 196. The housing encloses a rotary vane air motor 218 at its upper end, the motor driving an internally splined drive shaft 219 through a friction clutch 220. Air for driving the motor 218, and the motor of the A tool, is controlled through a solenoid actuated two-way valve J. A sleeve 221, having an integral annular piston 222 at its upper end, is confined within an annular cylinder chamber 225 defined by the tool housing. A washer 223 having a radial slot is fixed to the lower end of the sleeve 221. A gear shaft 224 includes an upper spline portion 224a received within the splined drive shaft 219 and driven thereby, an intermediate elongated gear portion 224b, and a lower journal portion 224c. An annular groove between the spline and gear portions is received within the radial slot of the washer 223. A sleeve bushing 226, axially fixed to the journal portion of the gear shaft in a manner to permit rotation of the shaft within the bushing, is mounted for axial sliding movement through an opening 227 in the lower end of the tool housing.

The tool element which performs the wrapping operation is a bit 229B comprising a sleeve 230 partially enclosing a bit member 231. The bit member and sleeve are coupled by a pin and slot arrangement which permits longitudinal movement of the sleeve with respect to the bit member and by which the sleeve is rotated with the bit member. The A tool bit will be referred to as bit 229A. The bit member includes an integral gear 232 adjacent its upper end. The sleeve is provided with an annular groove 233 intermediate its ends. The bit is rotatably mounted in the tool housing in suitable bores parallel to gear shaft 224 and adjacent to the housing periphery. The bit member is retained for rotation with respect to the housing, by retainer rings 234, in a manner to prevent axial movement. The sleeve is retained within its housing bore in a manner permitting axial movement and rotation. A transverse foot member 236 is threaded into the lower end of the sleeve bushing 226 and secured by a lock nut 235. The foot member is bifurcated defining a fork which receives, and which is received in, the annular groove 233 of the sleeve. It will now be seen that axial movement of the bit sleeve 230 is controlled by the piston 222 through the washer 223, the gear shaft 224, the sleeve bushing 226, and the foot member 236. A coil spring 237 is confined between the washer 223 and a transverse housing wall 238 to bias the washer, the bit sleeve, and the piston 222, to an uppermost position shown in FIGURE 10. Air admitted to chamber 225 above piston 222 moves these members downward. Air to this chamber, and to a corresponding chamber in the A tool, is controlled by a solenoid actuated three-way valve E. An idler gear 239, rotatably mounted on a shaft 240 couples the gear portion 224b of the gear shaft 224 and the bit gear 232. It will now be seen that the bit 229b is rotated by the motor through the drive shaft 219, the gear shaft 224, and the idler gear 239.

In FIGURE 10 the bit sleeve 230 is in its uppermost position with respect to the bit member 231. This is the normal "open" condition of the bit in which a wire may be fed transversely across the bit and held against the exposed lower end of the bit member. The lower end of the bit 229B is identical to that of the bit shown and described in the above mentioned Patent 2,885,764, particularly in FIGURE 2 thereof. FIGURE 10a shows the lower end of the bit member in the "open" condition with a wire 228, having a stripped end portion, laid across the bit member 231. The wire is clamped in this position by the B gripper, to be described, not shown here for the purpose of clarity. The bit is "closed" by withdrawing the bit member 231 into the sleeve 230 while the wire is held by the B gripper. This is accomplished by introducing air to the chamber 225 above the piston 222 as described above. FIGURE 10b shows the bit in the "closed" position. As the bit moves into the sleeve, the wire 228 is contacted by the lower end of the sleeve and is moved onto the cam surface 246. As this movement continues the wire rides up on the cam surface and is clamped between the rearward lip of the wire receiving groove 247 and the notch 241 on the sleeve. The wire is then laid into the wire receiving groove, in the manner shown in FIGURE 10b, the end of the wire extended through the slot 230' in the sleeve 230. At the lower end of the bit, the wire is bent, as shown, since the other end of the wire is held in the A tool bit 229A which is closed simultaneously. The wire is now in condition to be wrapped into terminals by the two bits. It will be seen that the portion of the B tool which rests on the foot member 206 of the B carriage is the gear shaft 224-sleeve bushing 226 assembly. When air is admitted above the piston 222 the sleeve is moved downwardly with respect to the bit member and the tool. Actually, however, the bit member, tool and tool holder move upwardly with respect to the B carriage since the sleeve cannot move downward.

In a wiring tool for a wiring machine it is essential that the bit be stopped or indexed in the same rotative position with respect to the tool since the wire is to be fed across a certain surface of the bit. FIGURE 10c particularly shows a portion of an indexing. A member 243 having an upward extending dog 242 is fixed to the gear shaft 224 just above the washer 223. This dog engages a slot 244 in the tool housing member 245 when the gear shaft is in its uppermost position. In the cycle of operation the bit is first closed, disengaging the dog from the slot 244, and this permits the motor to rotate the bit when air is applied. The bit is opened, raising the member 243, before the motor is stopped to permit the rotating dog to find and engage the slot stop rotation of the shaft. The friction clutch 220 permits rotation of the motor with respect to the drive shaft 219 and gear shaft 224 after the dog engages the slot.

Since the B tool and tool holder ride freely on the guide rods 198 and merely rest on the foot member 206, downward Z motion of the tool will be interrupted if the end of the bit should strike a misaligned terminal or other obstruction. In this event, the appropriate Z–1 or Z–2 limit switch, mentioned above, is not actuated and the succeeding functions of the machine do not take place until the fault has been corrected. Also, the tools may ride upward as the wire is wrapped on a terminal.

*Wire Preparation Unit*

Referring now particularly to FIGURES 11 through 14b there is shown a wire preparation unit 248 which is mounted on the A carriage in fixed relation to the A tool bit 229A and which performs the functions of cutting, stripping and feeding the wire 228. The forward end of the unit is shown at the right in FIGURES 11, 12 and 13. FIGURE 11 is an elevation view of the unit 248 as viewed from the front of the machine (see FIGURE 1) and showing its relationship to the bits 229A and 229B of the A and B tools respectively. The unit includes two slide assemblies, a sleeve assembly and a feed assembly, slidably mounted in a housing comprising two side members 249 attached to a bracket 250 which is rigidly attached to the A carriage.

The sleeve assembly includes two sets of stripping knives or strippers 251 and 253 and one set of cutting knives or cutters 252 supported in cutting and/or stripping relation by concentric outer and inner sleeves 254 and 255. The strippers are supported adjacent to the ends of the sleeves and the cutters are supported equidistant from the strippers. The strippers 251 are adjacent to the ends of the sleeves nearer the bit 229A. The inner sleeve 255 is supported by a pair of square shafts 256 and 257 which pass transversely through square openings in the sleeve walls in a press fit relationship. The outer sleeve 254 is provided with circumferential slots, through which the square shafts pass, which permit limited rotation of the outer sleeve with respect to the inner sleeve and which prevent relative axial movement. The shafts 256 and 257 are positioned respectively ahead of and behind the cutters 252, the ends of the shafts riding in longitudinal slots 258 in the side members 249. Two brackets 260 are bolted to the ends of the square shafts 256 and 257 and ride outside of the side members 249 to secure and guide the sleeve assembly with respect to the housing.

The outer sleeve 254 extends rearwardly beyond the inner sleeve 255. As best shown in FIGURES 13 and 13b, a transverse arm 261 passes through and is anchored to the rearwardly extending portion of the outer sleeve and terminates in a yoke 262 at its upper end. A single acting cylinder unit 263 is mounted in a cylindrical housing 268 rigidly supported above the sleeves by the brackets 260. The cylinder unit 263 is controlled through a solenoid actuated three-way valve D. The yoke 262 is engaged by the plunger 264 of the cylinder unit 263 to rotate the outer sleeve with respect to the inner sleeve. FIGURES 14, 14a and 14b are views showing only the forward ends of the sleeves and particularly the stripping knives 251. The forwardmost knife 251A is provided with a finger 265A at its upper end which is confined in a slot 255' in the inner sleeve 255. The rearwardmost knife 251B is provided with a similar finger 265B at its lower end confined in an identical slot in the opposite wall of inner sleeve. The lower end 266A of the knife 251A extends through a confining slot 254' in the outer sleeve 254 and the upper end 266B of the knife 251B is similarly confined in an identical slot in the opposite wall of the outer sleeve. Suitable leaf type retaining springs 267, shown in FIGURES 11 and 14, hold the strippers within the sleeve assembly, engaging the knife end 266A and 266B. The springs 267 are not shown in FIGURES 14a and 14b for the purpose of clarity. In FIGURE 14a, the particular manner in which the knives are retained in the inner sleeve 255 is illustrated. The slot 255' is irregular in shape and includes a forward portion which confines the end 265A of the knife 251A against movement and defines a pivot for the end 265A. The end 266B of the knife 251B is also confined in this slot but the slot is elongated to permit movement of the end 266B in the direction indicated by the arrow. This movement occurs when the outer sleeve 254 is rotated counterclockwise, as viewed in FIGURE 14. FIGURE 14b shows the particular manner in which the knives are retained in the outer sleeve 254. Here, the slot 254' is staggered and confines the end 266B of the knife 251B, in a manner to move the end 266B in both directions when this sleeve is rotated or oscillated. The forward portion of the slot 254' confines the end 265A of the cutter 251A; however, this portion is extended to permit the sleeve 254 to be rotated in the direction of the arrow with respect to the end 265A which, of course, does not move since it is confined by the inner sleeve. The sleeves are biased to the normal positions shown by a spring in the cylinder unit 263. In the positions shown, the cutting edges of the knives are sufficiently spaced to permit the passage of an insulated wire 228. In order to cut into the wire insulation, the outer sleeve 254 is rotated (counterclockwise in FIGURE 14) with respect to the inner sleeve, by the cylinder unit 263, thereby pivoting the knives 251 about their fingers 265 and closing the knives on the wire. The cutters 252 and the strippers 253 have identical structures except that the cutters have a different cutting edge configuration so that they will sever the wire rather than merely cut into the insulation. The strippers 251 and 253 are spaced from the cutters 252 a distance required for the desired length of bare wire which is to be wrapped on the terminals.

Several wire guide tubes are provided for guiding the wire through the sleeve assembly. A tube 270, mounted in the square shaft 256 extends between the strippers 251 and the cutters 252. A similar tube 271 mounted in the shaft 257 extends between the cutters 252 and the strippers 253. A tube 272 mounted in the arm 261 extends rearward from the strippers 253. This tube is provided with a transverse opening 275 which is enclosed by a collar manifold 273 for directing air forwardly through the tube from the manifold. A conduit 274, fixed to the manifold 273 may be connected to an air supply through a suitable valve.

The above described sleeve assembly includes brackets 260, which support the square shafts 256 and 257 and the cylindrical housing 268. The sleeves and associated knives are supported by the square shafts. The guide tubes 270, 271 and 272 and the tube 274 are supported within the sleeve assembly. This entire assembly is movable as a unit, as will be seen, guided within the slots 258 in the side members 249.

The feed assembly includes a housing 276 mounted in slides 277 in the unit side members 249. A feed roller 278, rotatably mounted in the housing 276, is driven only in the direction indicated by the arrow through a one-way clutch 285. The one-way clutch is driven by a single acting, rotary piston unit 279, mounted on the housing 276, which may be controlled by a suitable three-way valve to provide rotary oscillating motion to the one-way clutch. The rotary piston unit 279, as best shown in FIG. 12a, includes a generally cylindrical housing having a cylinder chamber 390. A vane 391, fixed to an axial shaft 392 is disposed in sealing relation within the cylinder chamber. A shoe 393, fixed within the housing, defines a start position and one limit of rotation for the vane 391. This shoe seals against the vane hub and defines, with the vane, an expansible chamber 390a. Air is admitted to the chamber 390a through an opening 394, which communicates with a control valve, to effect rotation of the vane in the direction indicated by the arrow and corresponding rotation of the shaft 392. A shoe 395, mounted within the housing, defines the other limit of rotation of the vane 391. As shown in FIG. 12a, the vane may rotate through an arc of 180°. The vane 391 is rotated back to the start position by means of a torsion spring (not shown). The opening 396 is a vent opening. The driving element of the one-way clutch 285 is fixed to the shaft 392. Rotation of the vane 391 in the direction indicated by the arrow (FIG. 12a) drives the feed roller 278 in the direction indicated by the arrows (FIG. 12). Hence a wire may be fed positively toward the forward end of the unit by the rotary piston unit 279; and the wire also may be pulled through the unit in the same direction by the B tool, since the one-way clutch permits rotation of the feed roller in the indicated direction. The feed roller may be provided with a spring brake to provide tension on the wire as it is pulled through the unit. A lower pressure roller 280 is mounted on an adjustable arm 281 spring biased for engagement with the feed roller. A single acting air cylinder unit 282 is mounted within the rearward end of the housing 276 for operating a clamping foot 283 (piston plunger) to clamp the wire against movement. The cylinder unit 282 may be controlled by a suitable three-way valve. A wire guide tube 284, mounted in the housing 276, is provided to guide the wire into the feed rollers. The foot 283 clamps the wire in this guide tube. All of the above mentioned guide tubes are aligned along the axis of the sleeve assembly and are flared at their rearward ends to facilitate passage of wire. The wire 228, shown in exaggerated size in the drawings, passes freely through the guide tubes.

A double acting air cylinder unit 292, which may be actuated by a suitable four-way valve, is mounted on one of the side members 249. The piston rod 295 of this cylinder unit is connected to a bracket 293 which is fixed to the housing 276. A connecting arm 290, which is pivotally mounted on the sleeve assembly cylinder housing 268, is provided with a longitudinal slot 291 at its rearward end. A boss 294, extending from the housing 276, is received within the slot 291 and is provided with a retainer ring to retain the arm 290. The arm 290 and the boss 294 define a lost motion connection between the above described sleeve assembly and feed assembly. In FIGURES 11, 12, and 13, the sleeve assembly and feed assembly are shown in forward positions relative to the unit housing defined by the side members 249. These assemblies are reciprocated between forward and rearward positions by the air cylinder unit 292. When the cylinder unit is controlled to extend the piston rod, the housing 276 and the feed assembly are moved rearward relative to the side members 249 and relative to the sleeve assembly until the boss 294 engages the rearward end of the slot 291. Then the feed assembly continues to move rearwardly relative to the side members 249, but carries with it the sleeve assembly. In total movement, the feed assembly moves twice the distance of the sleeve assembly, relative to the side members 294. The feed assembly is moved a distance somewhat greater than the distance between the strippers 251 and 253; and the sleeve assembly is moved a distance somewhat greater than the distance between the strippers 251 and the cutters 252.

The operating cycle of the wire preparation unit is as follows: At the beginning of the machine cycle, the sleeve assembly and the feed assembly are in the forward positions shown in FIGURES 11, 12 and 13. Assume that a continuous length of wire 228, from a suitable supply reel, has been directed into the rearward end of the guide tube 284 through the feed rollers and through the guide tubes 272, 271 and 270 to the position shown in FIGURE 13. The A and B tool bits 229A and 229B are in the home position and adjacent to each other, as shown in FIGURE 13. The leading end of the wire has been stripped and the wire is gripped at the B tool bit by means to be described. During the formation of the wiring pattern, the B tool moves away from the A tool and the wire 228 is drawn through the wire preparation unit, this movement of the wire being permitted by the one-way clutch.

When the tools have been moved to the selected positions for the particular wiring pattern, the wire is gripped at the A tool bit by means to be described. The cylinder unit 282 is then controlled to clamp the wire 228 in the feed assembly, as shown in FIGURE 13a. The cylinder unit 263 is then controlled to rotate the outer sleeve 254 to close the cutting and stripping knives to sever the wire and cut into the wire insulation as described. Then, referring particularly to FIGURE 13a, the cylinder unit 292 is controlled to move the feed and sleeve assemblies rearward. During the first portion of this movement, the feed assembly moves rearward relative to the sleeve assembly carrying with it a portion of the wire 228B and pulling this portion from a segment of wire insulation 228D which is retained between the strippers 253 and cutters 252. During the following portion of this movement, the sleeve assembly is moved rearward with the feed assembly and pulls a segment of wire insulation 228C, which is retained between the cutters 252 and the strippers 251, from the portion of the wire 228A which is gripped at the A tool. It will now be seen that the leading end of the supply wire 228B has been stripped for a succeeding cycle; the trailing end of the wire 228A, held by the tools, has been stripped at the A tool; and the machine is now conditioned to wrap the wire 228A on the selected terminals. To accomplish this, the tools move in a Z direction over terminals, and the wire 228A is moved in the Z direction relative to the wire preparation unit. At this time, the cylinder unit 263 is again controlled to open the cutters and strippers and air is directed through the tube 274, through manifold 273 and opening 275, and forwardly through the tube 272, providing an air blast to blow the wire insulation segments 228D and 228C from the forward end of the preparation unit. A suitable deflector (not shown) may be mounted on the A tool, for movement in the Z direction with the A tool, to direct the insulation segments away from the work area.

After the wire 228A is wrapped on the terminals, the wrapping tools return to their original positions in the Z direction and the tools are returned to the home position wherein the wrapping bits 229A and 229B are again adjacent to each other. Then the cylinder unit 292 is again controlled to return the sleeve and feed assemblies to their forward positions; the cylinder unit 282 is controlled to release the clamping foot 283 and permit movement of the wire 228B; and the rotary piston unit 279 is then controlled to drive the feed roller 278 in the indicated direction and feed the wire 228B to the position shown in FIGURE 13 where it is again gripped at the B tool bit for the succeeding cycle.

*Wire Gripping Assemblies*

Figure 8:
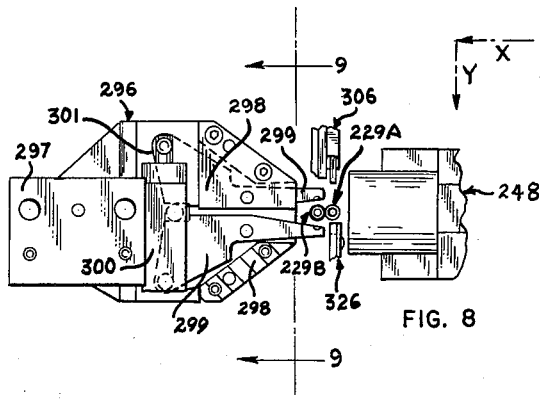
FIGURE 8 is a top view of the B tool gripper, including fragmentary views of other assemblies, taken along the line 8—8 of FIGURE 7, looking in the direction of the appended arrows.
Figure 7:
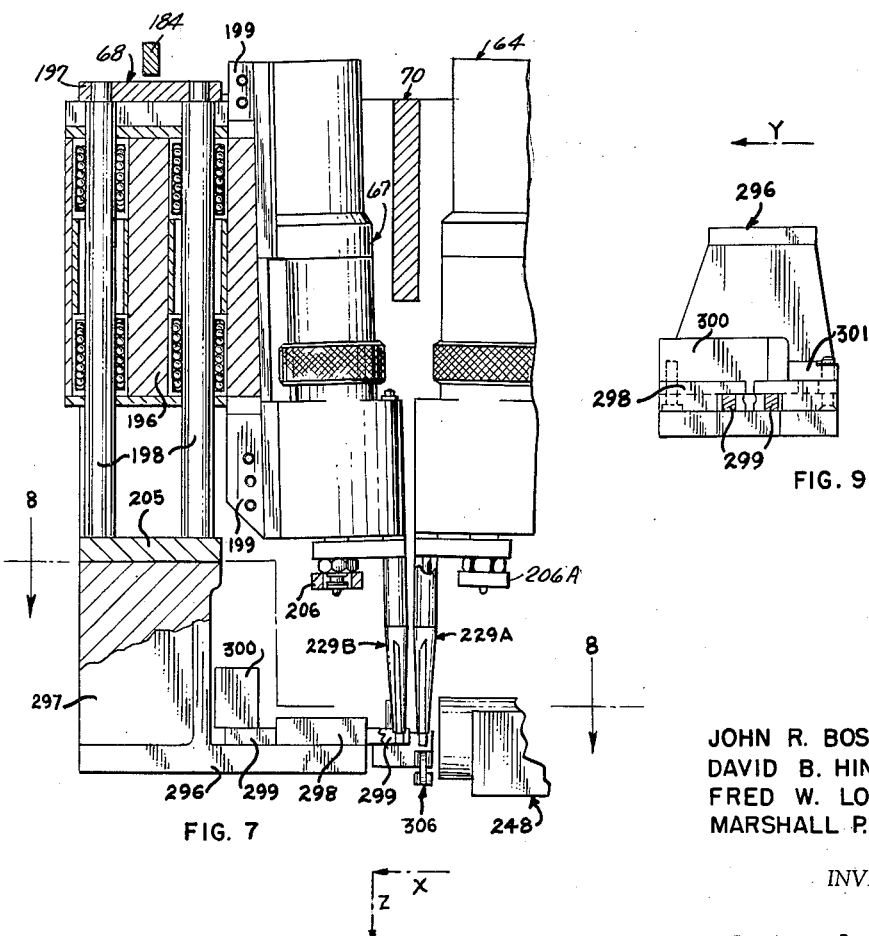
FIGURE 7 is a sectional view of the B tool carriage, including fragmentary views of other assembles, taken along the line 7—7 of FIGURE 2, looking in the direction of the appended arrows.
Figure 9:
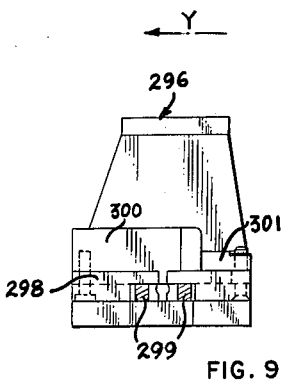
FIGURE 9 is an elevation view of the B tool gripper taken along the line 9—9 of FIGURE 8, looking in the direction of the appended arrows.

The B gripper assembly is particularly shown in FIGURES 7, 8 and 9. The B gripper assembly 296 for clamping the wire to the B bit includes a bracket 297 secured to and extending downward from the B carriage. In FIGURE 7, the assembly is viewed from the rear of the machine. A pair of cover plates 298 are secured to the bracket and these plates provide pivotal mountings and outer limit stops for a pair of gripping fingers 299 pivotally mounted intermediate their ends. A double acting air cylinder unit 300, controlled by a solenoid actuated four-way valve M, is pivotally attached to one gripping finger and its associated piston rod 301 is pivotally attached to the other gripping finger. As shown, the gripping fingers 299 are held in the open position by the cylinder unit, wherein the gripping ends of the fingers lie on opposite sides of the B tool bit. When a wire is fed by the wire unit 248 into the B tool gripper, it is fed into the gripper from right to left as viewed in FIGURES 7 and 8. The fingers 299 are then closed by the cylinder unit 300, one finger backing up the bit while the other finger clamps the wire against the bit. Considerable clamping pressure must be provided since the B tool pulls the wire from a supply source through the wire unit 248. The relative positions of the B gripper assembly, the A and B bits, the wire unit, the A gripper assembly, and dressing finger are indicated in FIGURES 7 and 8.

The A gripper assembly is particularly shown in FIGURES 15, 16 and 17. The A gripper assembly 306 is secured to the A carriage by means of a bracket 307. FIGURE 15 shows an elevation view of the gripper assembly as viewed from the right side of the machine. The assembly includes a housing member 308 having a longitudinal T groove and supporting, at one end, a double acting air cylinder unit 309. The cylinder unit 309 is controlled by a solenoid actuated four-way valve K. A forward slide 310 and a rearward slide 311 are mounted on the housing member 308 for longitudinal sliding movement in the T groove. A gripping finger 312 is pivotally mounted, intermediate its ends, at the forward end of the forward slide. The gripping finger is mounted to pivot from a substantially horizontal position (shown in full in FIGURE 15) to a substantially vertical position (shown by broken lines in FIGURE 15). A connecting link 313 is pivotally connected to the lower end of the gripping finger 312 and to the rearward slide 311. The forward and rearward slides are relatively movable and a maximum separation is provided by a bolt 314 passing through a hole in the rearward slide and threaded into the forward slide. The slides are held at this maximum separation by a pair of compression springs 315 which seat in aligned holes in the forward and rearward slides. The piston rod associated with the air cylinder 309 is fixed to the rearward slide 311. The normal positions of the rearward and forward slides are shown in the drawings. The position of the A tool bit with respect to the A gripper assembly in shown in FIGURE 15.

In order to grip the wire at the A tool, the air cylinder unit 309 moves the rearward slide forward and the forward slide is moved forward by the springs 315, maintaining its relationship to the rearward slide until its forward motion is stopped by a stop pin 316 which rides in a groove 317 in the forward slide. When the forward movement of the forward slide is stopped, its forward face 318 lies contiguous to the A tool bit. Forward movement of the rearward slide continues, compressing the springs 315, to pivot the gripping finger 312 to the gripping position shown by the broken lines in FIGURE 15. The bit is then backed up by the forward face 318 while the finger 312 clamps the wire against the appropriate bit surface.

*Dressing Finger Assembly*

The DF carriage is particularly shown in FIGURES 18, 19 and 20. The DF carriage, mounted on the A carrier, is locked in position on the carrier guide rod 111 by a taper pin which engages the holes 173. The taper pin is spring biased out of engagement with the holes and is actuated by a single acting air cylinder unit 320. The air cylinder unit 320 is controlled by a three-way slide valve 321 mounted in the fork member 183 of the B carriage interlock on the DF carriage and having an integral plunger 322. The valve is spring biased to project the plunger into the fork member to be actuated by the finger 184 of the B carriage interlock. When the B and DF carriages are in locked position, the finger 184 positions the valve 321 to actuate the cylinder unit 320 to effect disengagement of the taper pin from a hole 173. When the B carriage separates from the DF carriage, the valve is positioned to actuate the cylinder unit to engage the taper pin and lock the DF carriage in position.

The DF carriage includes a downwardly extending housing defining a cylinder chamber 323 enclosing a piston 324 and an associated piston rod 325 extending upwardly and downwardly beyond the cylinder chamber. A dressing finger assembly 326 is mounted on the lower end of the piston rod and a limit screw 327 is threaded into the upper end of the piston rod to fix the limit of downward movement of the assembly 326 with respect to the housing. The piston is biased to its uppermost position by a coil spring 328 within the cylinder chamber.

The dressing finger assembly 326 comprises a block 329 having a bore for receiving the lower end of the piston rod 325. A coil spring 330, compressed between the block and a snap ring 338 fixed to the rod, biases the block to a lowermost position against a retaining ring 339 on the end of the piston rod. A guide pin 331, fixed in the block 329 extends upward through a bore in the housing to prevent rotation of the dressing finger assembly. A dressing finger plate 332 is mounted on the block, for limited transverse sliding motion, by a slide plate 333. A single acting air cylinder unit 334, mounted on the block, includes a biasing spring which normally holds the dressing finger plate spaced from the A tool bit 229A (to the right as seen in FIGURE 19). Air to the cylinder unit 334 is controlled by a solenoid actuated 3-way valve L. The dressing finger plate includes an integral downwardly extending dressing finger 335 having an upward extending bore to accommodate a terminal and having a boss at its tip to retain a wire on the finger. A pusher finger 336 is secured to the dressing finger by pins passing through slots in the pusher finger. The pusher finger is actuated with respect to the dressing finger by a single acting air cylinder unit 337 secured to the block 329 by a bracket (not shown in FIGURE 20). A spring associated with the air cylinder unit holds the pusher finger in the upper position shown. Air to the cylinder unit 337 is controlled by a solenoid actuated three-way valve R. When the pusher finger is moved downward by the cylinder unit 337, its lower tip moves to the right (FIGURE 20), due to the configuration of the slots, and pushes a wire off the tip of the dressing finger.

The dressing finger assembly 326 is moved downward when air is admitted above the piston 324 and this movement is sufficient to carry the wire close to the panel regardless of whether or not the wraps are being made in the Z–1 or Z–2 positions of the tools. Air to the chamber 323, above piston 324, is controlled by the same solenoid actuated three-way valve H which controls the Z motion of the A and B tools. Should the dressing finger engage any obstruction, the dressing finger assembly may move upward with respect to the piston rod 325 against the spring 330. The dressing finger assembly moves downward with the A and B tools. The pusher finger is actuated just prior to the raising of the dressing finger assembly.

In making wraps between certain selected terminals, the dressing finger assembly 326 maintains the position relation to the A tool bit 229A shown in FIGURES 8 and 19; hence it is not possible to use the A gripper assembly 306 (see FIGS. 7, 8 and 19) to clamp the wire to the A tool bit because the dressing finger 335 would interfere with the A gripper. In this event, the air cylinder unit 334 is actuated to move the dressing finger 335 to clamp the wire against the A tool bit. Also the pusher finger 336 may not be actuated when this relationship exists or when the finger is removed only one module from the A bit, due to interference. Limit switches LS–AG (FIG. 33) and LS–DS (FIGURE 34) are controlled by the relative separation between the A and DF carriages. Limit switch LS–AG selects the dressing finger gripper when these carriages are in locked position and selects the A gripper when the carriages are separated. Limit switch LS–DS prevents operation of the pusher finger 336 when there is less than two modules of separation between the carriages.

*Operating Cycle*

An operating cycle of the machine will now be described, including the formation of an L-shaped wiring pattern, beginning with the tools in the home position as shown in FIGURE 2. In a preferred embodiment of the machine, all the operations are controlled through a suitable electric circuit, except as indicated hereafter; some of the operations being controlled through the manual switches and other operations being controlled automatically through limit switches, control relays and sequential timing devices. The manual switches may be actuated by an operator working from a printed program, for example.

The following conditions are extant at the beginning of the cycle. The cylinder units 146 of the X and Y drive mechanisms are controlled to disengage their respective pawls 143 from the respective sprags 142, and air is directed to the drive cylinders 130X and 130Y to hold the respective carriers and carriages in the home positions. Air is directed to the cylinder units 157 and 158, of the A and B carriers, and to the cylinder units 175 and 176, of the A and B carriages, respectively, to disengage the respective taper pins from the slide rods to permit movement of the carriers and carriages. Since the finger 184 of the B carriage interlock is received in the fork member 183, the valve 321 is actuated to direct air to the cylinder unit 320 of the dressing finger carriage, to disengage its respective taper pin from the slide rod. The cylinder unit 182, of the A carriage interlock, and the cylinder unit 185 of the B carriage interlock, are controlled to engage the respective shot pins and thereby lock the A, B and DF carriages together. The wire preparation unit 248 has been loaded with the wire 228, the leading end of the wire has been stripped, and the leading end of the wire has been fed to the proper position relative to the B tool bit as shown in FIGURE 13. The cylinder unit 300, of the B gripper assembly, is controlled to effect the gripping of the wire at the B tool bit. Air is vented from the cylinder unit 282 to effect disengagement of the clamping foot 283 to permit movement of the wire through the wire preparation unit.

The first step by the operator is to actuate an appropriate selector switch to rotate the index table 62, and therefore the panel 63, to the desired quadrant position. When the appropriate switch is actuated, the control valve for the cylinder unit 90 is actuated to cycle the index table in 90° increments from the extent position to the selected position.

The next step by the operator is to actuate appropriate switches to select the Z–1 or Z–2 positions for the A and B tools. When these switches are actuated, the control valves for the cylinder units 211 of the A and B carriages are actuated to position the slides 212 in the selected positions.

Following these operations, the machine is conditioned for moving the A tool in the X direction away from the home position to a selected stop position. For this operation, the operator first actuates selected program switches to set up, in a bridge circuit, for example, an appropriate voltage corresponding to the number of modules the A tool is to be moved. The operator then actuates an "operate" switch which controls the valves for the X drive cylinder to effect drive of the B carriage in the X direction relative to the B carrier. Since all of the carriages are interlocked, the A carriage and the DF carriage are moved in the X direction relative to the A carrier. During this movement the potentiometer 145X, which is connected in the above-mentioned bridge circuit, is driven. The valve 153, in the hydraulic bypass of the X drive mechanism is normally open to permit rapid drive. The valve, actuated by a solenoid XD which is controlled by the above-mentioned bridge circuit, is closed when the A carriage moves to a point which is a fixed number of modules from the selected stop position. At such point the flow of fluid through the bypass passage 150 is stopped to slow the movement of the carriages to facilitate accurate engagement of the pawl 143 with the sprag 142. The solenoid valve XS, which controls the pawl cylinder unit 146, may be controlled by the same bridge circuit to effect engagement of the pawl with the sprag, when the bridge circuit signals that the selected stop position has been reached. The A carriage is then stopped at the selected X position.

The operator then actuates appropriate program switches for selecting the number of modules of movement for the A tool in the Y direction. Following this, he actuates the operate switch which controls the valves for the Y drive cylinder to effect drive of the B carrier in the Y direction. Since the carriages and carriers are locked together, the A carrier and the A carriage are moved in the Y direction. During this movement, the potentiometer 145Y is driven by the Y drive mechanism and controls, with an associated bridge circuit, the associated valve 153 through its operating solenoid YD to slow the drive at the appropriate time. The potentiometer also controls the solenoid valve YS which controls the pawl cylinder unit 146 to engage the pawl 143 at the selected stop position. The manner of control by the potentiometer 145Y is the same as that for the potentiometer 145X.

Movements of the A carrier and A carriage are now completed and the A tool bit is positioned over the selected terminal, Xa, Ya in FIGURE 2b for example. The respective cylinder units 157 and 175 of the A carrier and the A carriage are controlled to engage the respective taper pins with the slide rods to accurately position and lock these members relative to the slide rods. The cylinder units 182 and 185, of the A and B carriage interlocks respectively, are controlled to disengage the respective shot pins so that the A and B carriages are no longer locked to the DF carriage.

The operator then positions the B tool by actuating appropriate program switches to select the number of modules of X movement and actuating an operate switch to control the cylinder unit 146 of the X drive mechanism to disengage its pawl 143 from the associated sprag 142 and to control the X drive cylinder to effect drive of the B carriage by the X drive mechanism. The B carriage now moves to the selected stop position in the same manner as that described for X motion of the A carriage. During this movement, the DF carriage is carried with the B carriage since the finger 184 remains engaged with the fork member 183. The dressing finger 335 is now positioned over a preselected terminal, Xb, Yb in FIGURE 2b for example.

The operator then actuates appropriate program switches to select the number of modules of movement for the B tool in the Y direction and actuates an operate switch to control the cylinder unit 146 of the Y drive mechanism to disengage its pawl 143 from the associated sprag 142 and to control the Y drive cylinder to effect drive of the B carrier by the Y drive mechanism. The B carrier and B carriage are then moved to a selected stop position in the same manner as that described for Y motion of the A carriage. During this movement, the B carriage moves away from the DF carriage, and the finger 184 moves out of the fork member 183 permitting the valve 321 to shift. This vents air from the cylinder unit 320 effecting engagement of its associated taper pin with the slide rod, to accurately position and lock the DF carriage relative to the slide rods.

Following this movement, the B tool is positioned over the selected terminal, Xc, Yc in FIGURE 2b for example. The cylinder units 158 of the B carrier and the cylinder unit 176 of the B carriage are now controlled to engage the respective taper pins to accurately position and lock the B carrier and B carriage relative to the slide rods.

During the above described motion of the B tool relative to the A tool, the wire 228 has been pulled by the B tool through the wire preparation unit and has formed an L-shaped pattern around the dressing finger 335. The cylinder unit 309 of the A gripper assembly is now controlled to effect the gripping of the wire at the A tool. The wire preparation unit is then actuated, in the manner described previously, to cut and strip the wire adjacent to the A tool. The cylinder unit 282 is controlled to clamp the wire in the feed assembly; the cylinder unit 263 is controlled to close the knives; and the cylinder unit 292 is controlled to strip the ends of the wire. Air is then directed to the chambers 225 of the A and B tools to close the bits, thereby loading the wire in the bits, and the machine is now conditioned for the wrapping portion of the cycle.

The air directed to the chambers 225 of the A and B tools moves the bit sleeves 230 downward relative to the tool bits 231. Actually, as previously described, the bit sleeves 230 remain fixed relative to the foot members 206 and the tool housings and tool bits 231 move upward relative to the bit sleeves. Hence, the bits 230 are drawn into the sleeves 231 and this can be done while the A and B grippers remain in gripping relationship with the respective bits. Following this, the cylinder unit 309 of the A gripper and the cylinder unit 300 of the B gripper are controlled to open the respective gripper fingers. Air is now directed to the chambers 202, of the A and B carriages, to move the respective foot members 206 downward, permitting the A and B tools to move downward in a Z direction over the panel terminals. Simultaneously, air is directed to the chamber 323 of the DF carriage to move the dressing finger assembly 326 downward in a Z direction along with the A and B tools. Air is then directed to the motors 218 of the A and B tools to rotate the wrapping bits and wrap the ends of the wire onto the respective terminals. During the wrapping operation, cylinder unit 263 is controlled to open the knives, air is directed to the conduit 274, in the wire preparation unit, to blow the insulation segments 228C and 228D from the sleeve assembly, and the cylinder unit 337 of the dressing finger assembly 326 is controlled to actuate the pusher finger 336 to disengage the wire from the dressing finger 335. When the wrapping of the wire is completed, air is vented from the chambers 202 of the A and B carriages and from the chamber 323 of the DF carriage to permit the respective springs to move the A and B tools and the dressing finger assembly 326 upward in a Z direction. During or immediately following the reverse Z motion of the A and B tools, air is vented from the chambers 225 of the A and B tools permitting the springs 237 to open the bits. During the opening of the bits, the dog 242 is received in the slot 244 (FIGURE 10c) to stop rotation of the bits in the properly indexed rotational position as previously described. The torque of the two motors 218 is absorbed in the friction clutches 220 until the motors are stopped immediately thereafter.

This completes the wrapping operation and the machine is conditioned to return the carriages and carriers to the home position. Cylinder units 157 of the A carrier and 175 of the A carriage are controlled to disengage the respective taper pins from the slide rods and these units now ride free on the respective slide rods. Cylinder units 158 of the B carrier and 176 of the B carriage are controlled to disengage respective taper pins from the slide rods. Cylinder unit 146 of the Y drive mechanism is controlled to disengage its pawl 143 and the Y drive cylinder is controlled to drive the B carrier in the reverse Y direction. During this motion, the B carriage remains fixed relative to the B carrier, since the pawl 143 of the X drive mechanism remains engaged. The DF carriage also remains locked in position on the A carrier until the finger 184 of the B carriage moves into the fork member 183 of the DF carriage. When this occurs, the valve 121, in the DF carriage, is actuated to control the cylinder unit 320 to disengage its associated taper pin from the slide rod, and the DF carriage is now free to move in the X direction with the B carriage. During this motion, the B carrier moved to its home position and pushed the A carrier to its home position. The cylinder unit 146 of the X drive mechanism is now controlled to disengage its pawl 143 and the X drive cylinder is actuated to drive the B carriage in a reverse X direction to the home position. The DF carriage moves with the B carriage and the DF carriage engages and pushes the A carriage to its home position. When this motion is completed, all of the carriages and carriers have been returned to the home position.

Following this, the wire preparation unit feeds the wire to the B tool for the succeeding cycle; cylinder unit 292 is controlled to return the feed and sleeve assemblies of the wire preparation unit to the position shown in FIGURE 13; cylinder unit 282 is controlled to release the clamping foot 283; and the rotary piston unit 279 is controlled to drive the feed roller 278 in the indicated direction to feed the wire 228 to the position shown in FIGURE 13 to be gripped by the B tool bit 229B. Cylinder units 182 and 185, of the DF carriage, are controlled to engage the shot pins of the A and B carriage interlocks so that the A, B and DF carriages are again locked together. Cylinder unit 300 of the B gripper assembly is then controlled to close the gripper fingers 299 and grip the wire at the B tool bit. This completes the machine cycle and the machine is conditioned for the succeeding cycle.

Operating Circuit

The detailed operation of the machine will now be described in conjunction with the operating circuit which is shown diagrammatically in FIGURES 21 to 35 and 37. The circuit is drawn substantially in accordance with JIC (Joint Industry Conference) standards. At the left hand side of each figure, reference numbers are shown for the purpose of locating the several circuit elements. In the following description, the location of the circuit elements will be identified, generally, by these reference numbers, in parentheses, rather than by figure numbers. Two types of relays are shown in the circuit and are identified by their coils, which are shown as a circle, and an appropriate designation. Control relays are identified as CR M (2) for example. Latching relays have two coils, one for latching the relay and one for unlatching the relay. The latching relay is identified by its latching coil, as CRL G (3), for example, and its unlatching coil is identified as CR U G (89). At the right hand side of the circuit figures, numerals appear adjacent the control relay coils and the latching coils of the latching relays to indicate the location of their respective contacts. Plain numbers indicate normally open contacts and underlined numbers indicate normally closed contacts. Numbers in parentheses adjacent the unlatching coils of the latching relays indicate the location of the latching coil for the respective relays.

Contacts of each control relay are shown in the normal condition, which is the condition when the relay coil is de-energized. Contact CR C–1 (4), for example, is normally closed; and contact CR M–1 (2), for example, is normally open. Contacts of each latching relay are shown in the condition when the unlaching coil of the relay has been energized and the relay is, therefore, unlatched. Contact CRL 9–1 (12), for example, is closed when the unlatching coil CRU 9 (5) is energized; and this contact is open when the latching coil CRL 9 (8) is energized. Contact CRL 9–2 (13), for example, is open when the unlatching coil CRU 9 is energized, and is closed when the latching coil CRL 9 is energized.

All power is provided for the machine by a power supply (not shown). The power supply provides various A.C. and D.C. voltages for the operating circuit. Except when indicated, the voltages as shown on the circuit drawings are D.C. With the power supply on, certain portions of the circuit received power immediately. Certain of the control relays are energized or de-energized and certain of the latching relays are latched or unlatched as determined by the previous machine cycle. The latching coils of the following latching relays had been last energized during the preceding cycle; therefore, these relays are latched at the beginning of the machine cycle to be described and the beginning of each succeeding cycle: CRL I (30), CRL AX (27), CRL BX (28), CRL AY (174), CRL BY (175), CRL C (183), CRL D (184), CRL F (185), CRL J (51). The following control relays are energized at the beginning of the cycle when the power supply is on: CR C (62), CR F (166), CR H (178), CR N (186), CR P (188), CR S (198), CR T (199). All other control relays are de-energized. Since the tools are in the home positions, normally open limit switches LS BX (49) and LS BY (27) are closed.

To start the machine, start switch PB–B (1) is actuated to energize relay CR M (2) which holds through its contact CR M 1 (2) and normally closed stop switch PB–E (2). CR M 1 lights start light 345 (1) and latches relay CRL G (3). This contact also provides ground for various parts of the circuit through conductors RP 9 (2), CP 12 (2), and CP 18 (10). Relay CR G is energized. Contact CR M–4 (90) closes to provide ground to the circuits for valve solenoids XF (90), XR (91), YF (93) and YR (94). Valve solenoids XF and XR control air to the X drive cylinder. Valve solenoid XF controls air to the forward end of the cylinder drive chamber and effects movement of the tools to their wrapping positions when live air is admitted. Valve solenoid XR controls air to the reverse end of the cylinder drive chamber and effects return movement of the tools when live air is admitted. Similarly, valve solenoid YF controls air to the forward end of the Y drive cylinder drive chamber and valve solenoid YR controls air to the reverse end of the cylinder drive chamber. Valve solenoids XF and YF are now energized since respective contacts CRL AX–4 (90) and CRL AY–8 (93) are closed, and the forward ends of both drive cylinders are open to atmosphere. Valve solenoid XR is de-energized, since contacts CRL AX–5 (91) and CR N–3 (92) are open, and live air is admitted to the reverse end of the X drive cylinder. Valve solenoid YR is de-energized, since contact CRL AY–9 (94) and CRL BY–7 (95) are open, and live air is admitted to the reverse end of the Y drive cylinder. Hence the carriages and carriers are held in their home positions. All of the taper pins are disengaged from their respective guide rods. The interlock pins are engaged so that all of the carriers and carriages are locked together.

Figure 21:
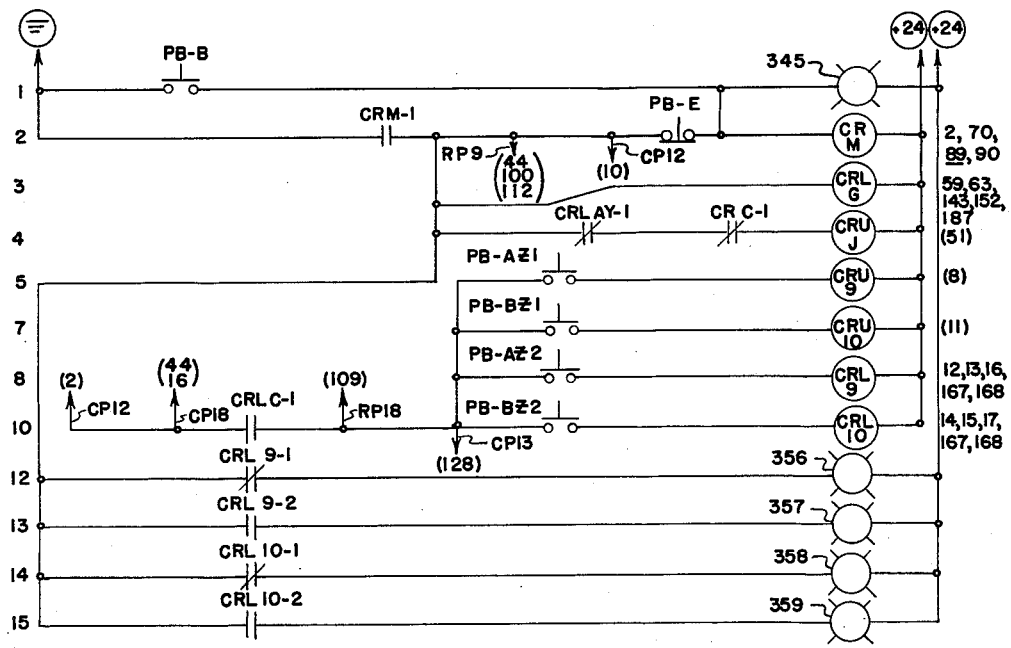
Figure 22:
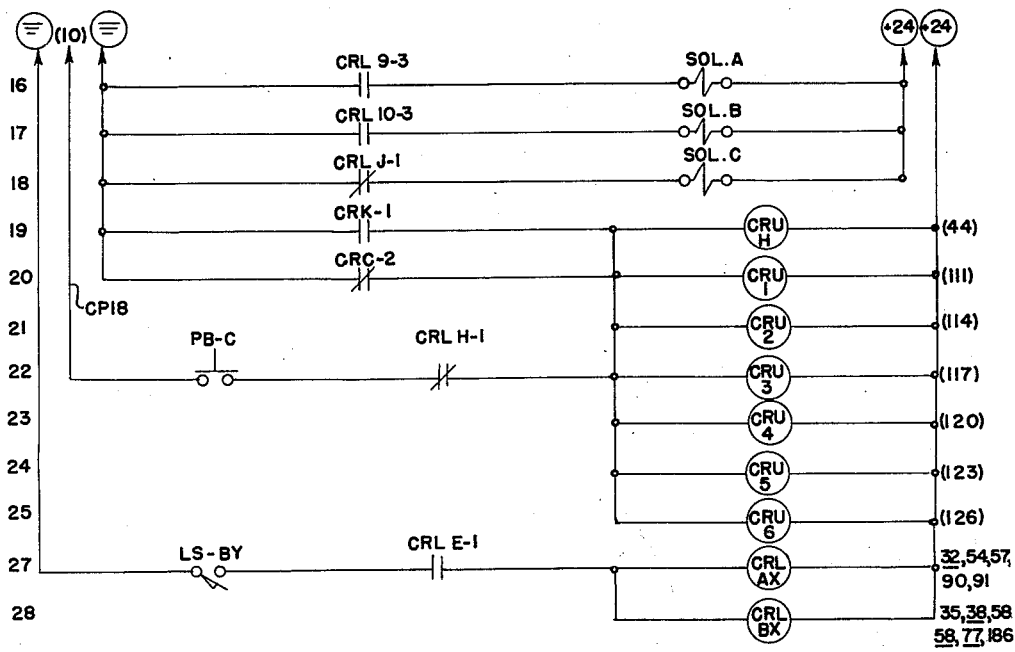
Figure 23:
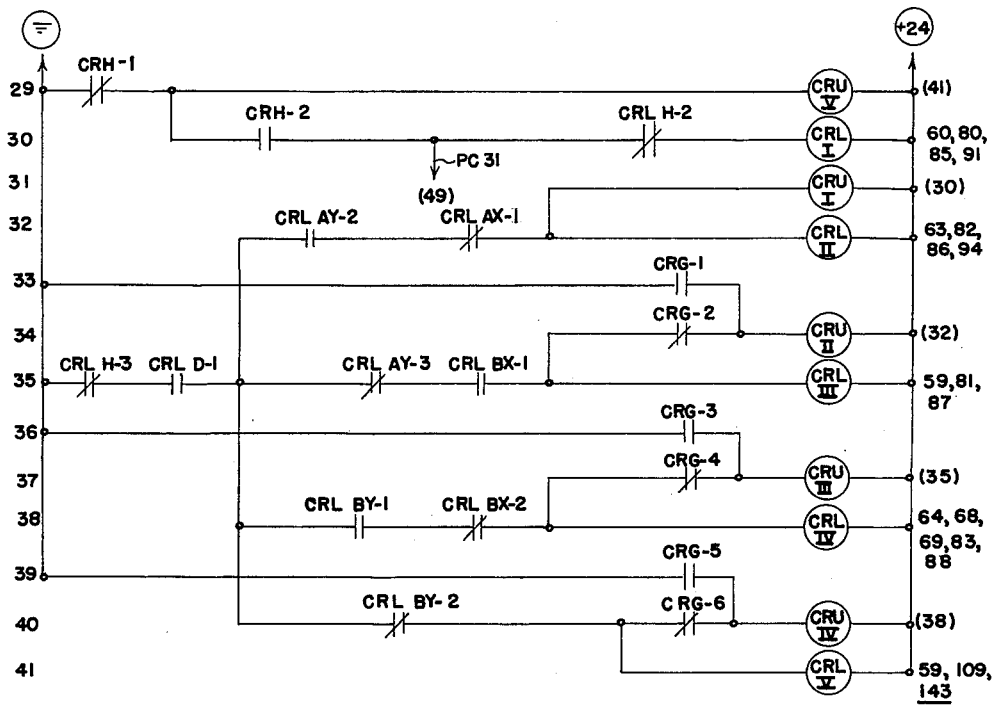
Figure 24:
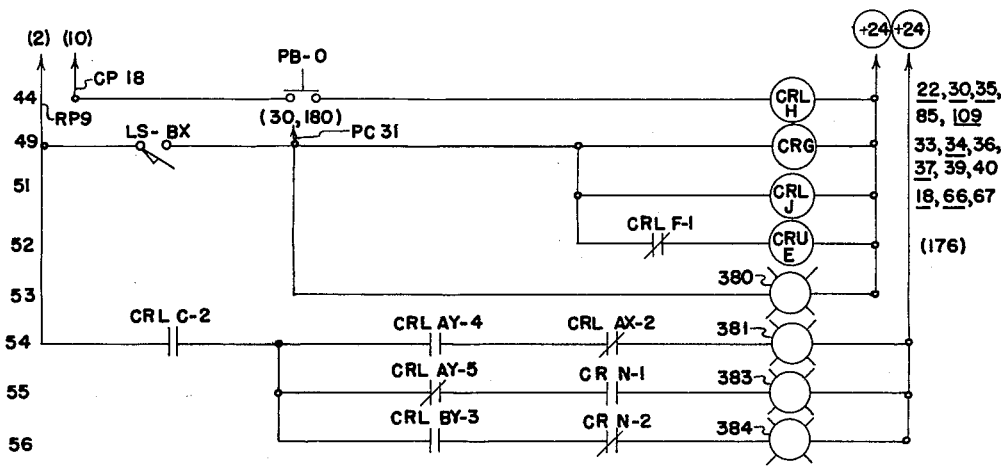
Figure 25:
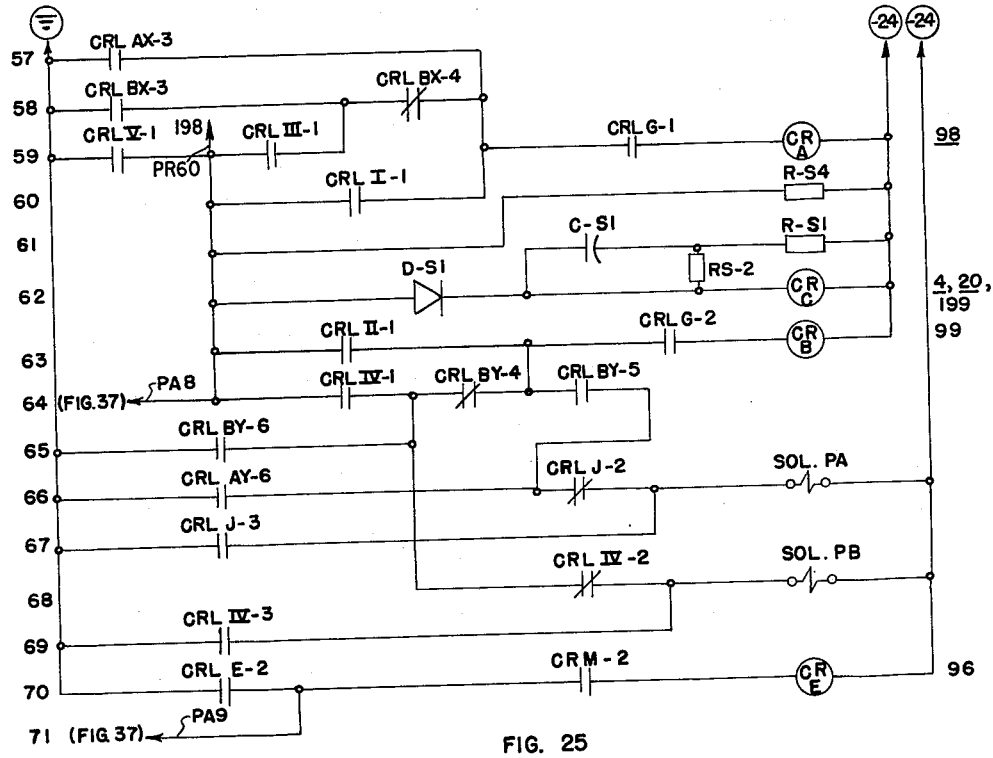
Figure 26:
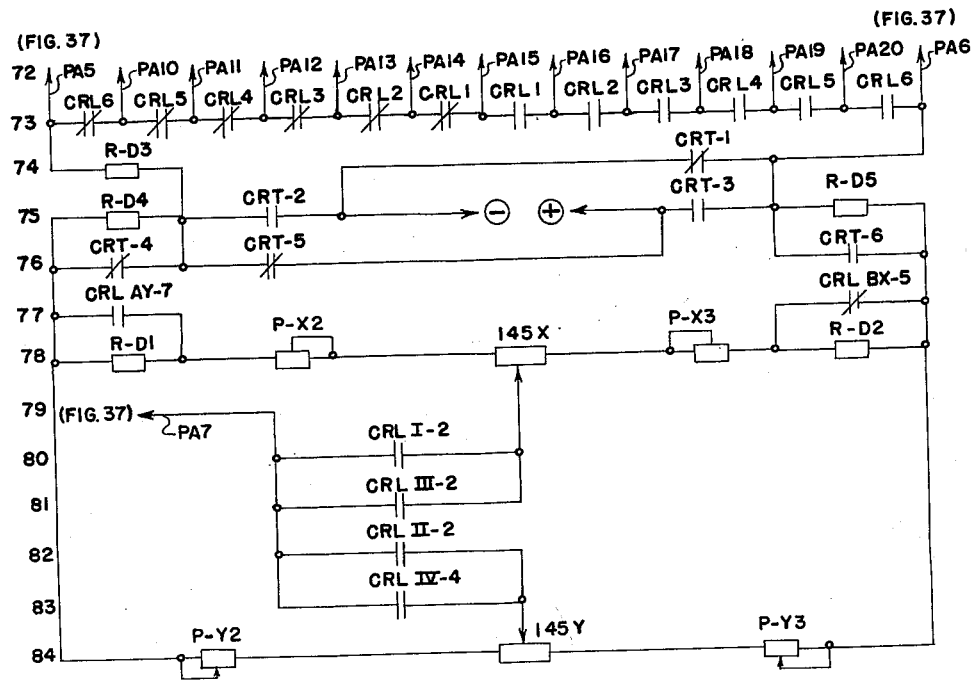
Figure 27:
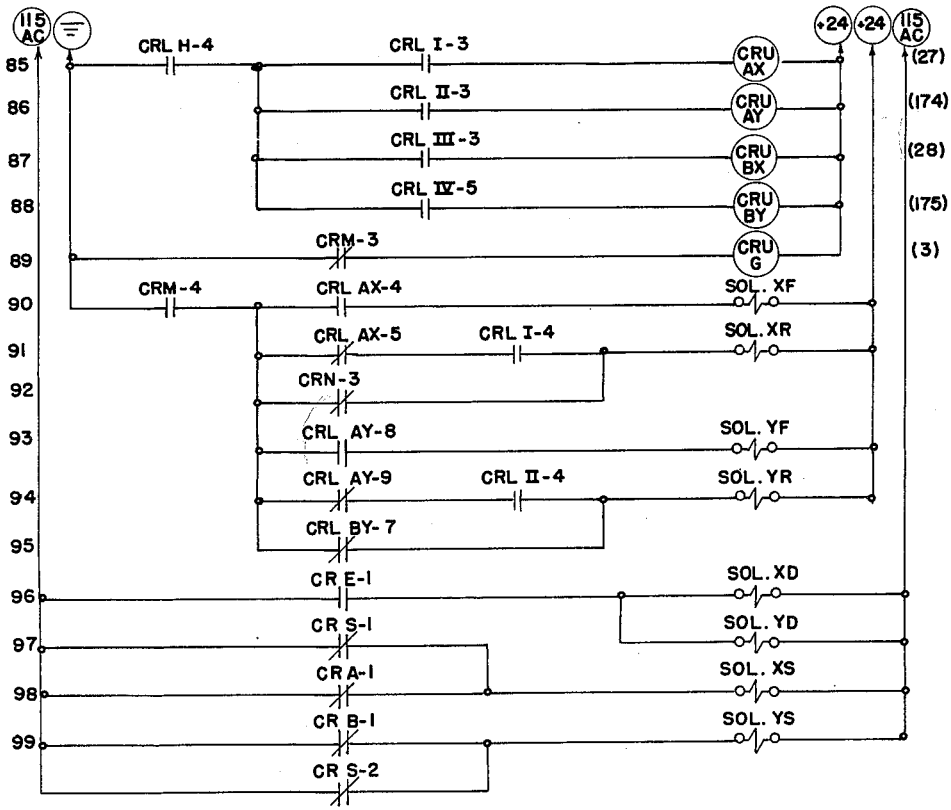
Figure 28:
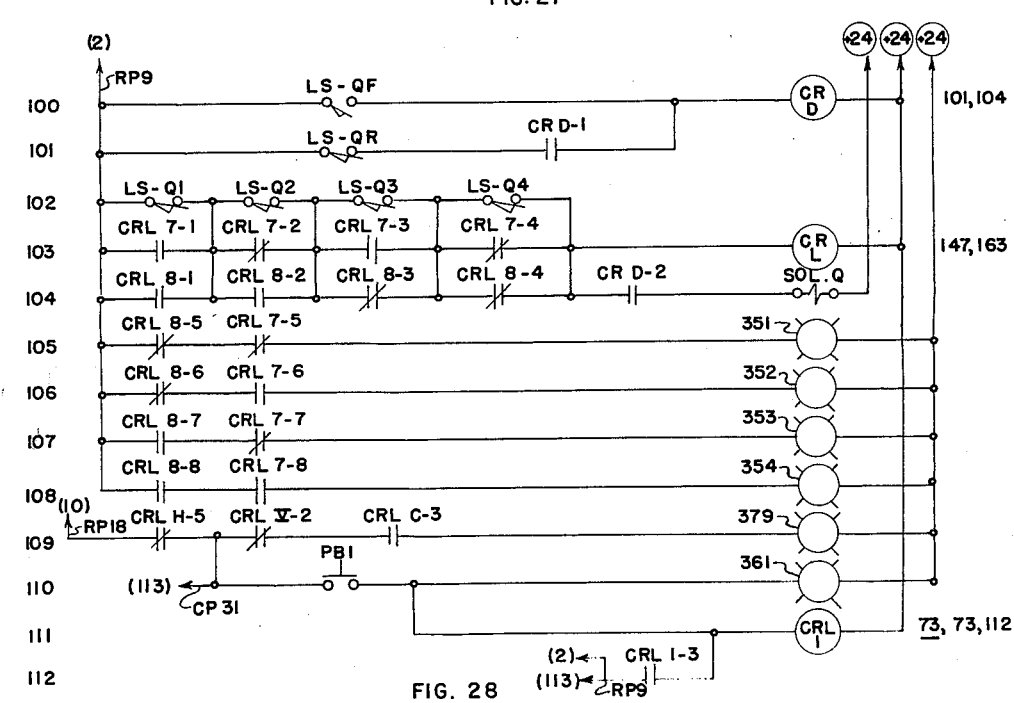
Figure 29:
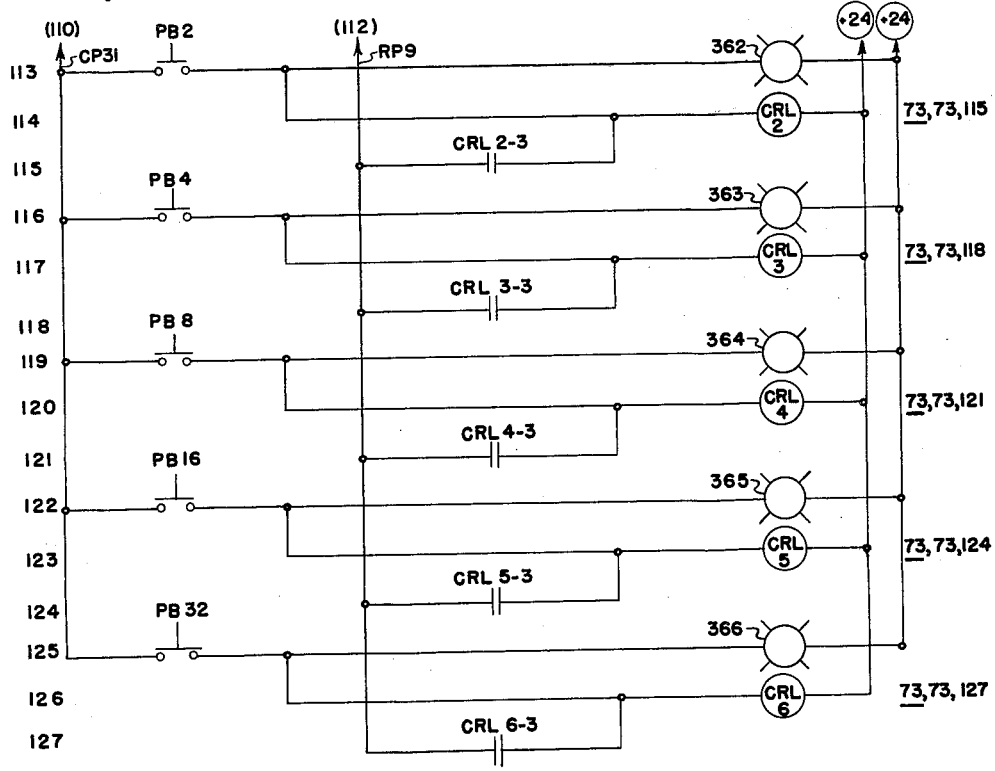
Figure 30:
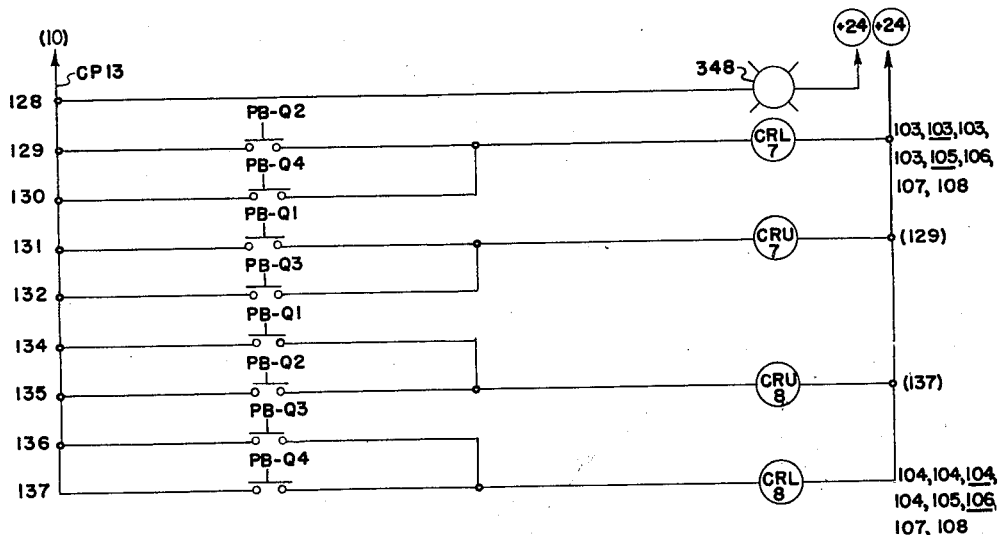

Relay CRL C (183) is latched and its contact CRL C–1 (10) provides ground for the XY program switch circuit, through conductor RP 18 (10, 109); for the index table position selection circuit, through conductor CP 13 (10, 128); and for the Z position selection circuit (FIGURE 21). A "position change" indicator light 348 (128) is lit indicating that index table and Z position changes may be made.

Contact CRL G 1 (59) closes to provide ground for relay CR A (59); its contact CR A–1 (98) opens to de-energize valve solenoid XS (98) which actuates cylinder unit 146 to disengage the pawl 143 from the sprag 142 of the X drive mechanism. Contact CRL G–2 (63) closes to provide ground to energize relay CR B (63) through contacts CRL BY–5 (64) and CRL AY–6 (66). Its contact CR B–1 (99) opens to de-energize valve solenoid YS (99) actuating cylinder unit 146 to disengage the pawl 143 from the sprag 142 of the Y drive mechanism. Contacts CRL G 3 (143) and CRL G 4 (152) open to permit operation of cam timer motors M1 (141) and M2 (150). Contact CRL G 5 (187) opens to shut out stop light 346 (187). Relay CR M (2) may only be de-energized by stop switch PB–E (2). When this occurs, relay CRL G (89) is unlatched.

Index Table Circuit

Push button switches PB–Q1 (131, 134), PB–Q2 (129, 135), PB–Q3 (132, 136) and PB–Q4 (130, 137) are provided for selecting quadrant positions 1 to 4 repectively of the index table 62. When actuated, these switches latch or unlatch relays CRL 7 (129, 131) and CRL 8 (135, 137). Contacts 5 to 8 (105 to 108) of these relays are closed or opened to light one of the quadrant lights 351 to 354 to indicate the selected quadrant position.

When the table is indexed in any position, normally open limit switch LS–QF (100) is held closed by the index table pawl and relay CR D (100) is energized. Relay CR D is held through its contact CR D–1 (101) and normally closed limit switch LS–QR. Contact CR D–2 (104) is closed providing ground for valve solenoid Q (104) provided a series-parallel circuit, consisting of normally closed limit switches LS–Q1, LS–Q2, LS–Q3 and LS–Q4 (102) each in parallel with an associated contact (103) of relay CRL 7 and an associated contact (104) of relay CRL 8, is a closed circuit.

If it is assumed that the table is in position 4, switch PB–Q4 (130, 137) had been actuated to latch relays CRL 7 (129) and CRL 8 (137). Contacts CRL 7-4 (103) and CRL 8-4 (104) are therefore open. Limit switch LS-Q4 (108) is also open, being held open by pin 94 on the index table fixture plate 89; therefore the series-parallel circuit is an open circuit and valve solenoid Q is not energized.

Assume now that quadrant position 2 is to be selected. Switch PB-Q2 (129, 135) is actuated, having no effect on relay CRL 7 but unlatching relay CRL 8. Contact CRL 8-4 then closes providing ground through the now closed series-parallel circuit to energize valve solenoid Q which actuates its associated index table cylinder unit 90 to retract the rack and pawl and limit switch LS-QF opens. When the rack is fully retracted limit switch LS-QR opens de-energizing relay CR D, its contact CR D-2 opening to de-energize solenoid Q and the cylinder unit 90 is now actuated to move the rack and pawl forward to rotate the index table. Limit switch LC-Q4 immediately closes and the index table is rotated 90° to position 1 at which limit switch LS-Q1 is opened by its associated pin 91 on the fixture plate 89 and limit switch LS-QF is again closed by the pawl. Relay CR D again energizes, its contact CR D-2 closing, and valve solenoid Q is again energized since the series-parallel circuit is a closed circuit through contact CRL 7-1 and limit switches LS-Q2, LS-Q3 and LS-Q4. The cylinder unit 90 again drives the rack and pawl through the cycle above described and the index table is rotated 90° to position 2, at which limit switch LS-Q2 is opened by its associated pin 92 on the fixture plate 89. Since contacts CRL 7-2 and CRL 8-2 are open, the series-parallel circuit is now an open circuit so that valve solenoid Q remains de-energized and the index table remains in selected position 2.

Relay CRL (103) is energized when the series-parallel circuit is closed. Its contact CRL 1 (147) in the motor M1 circuit closes to prevent operation of the motor during table indexing. Its contact CRL 2 (163) opens to prevent Z motion of the tools and dressing finger assembly during table indexing.

*Z Position Selection Circuit*

Push button switches PB-AZ1 (5), PB-AZ2 (8), PB-BZ1 (7) and PB-BZ2 (11) are provided for selecting respectively the Z1 and Z2 positions for the A tool and the Z1 and Z2 positions for the B tool. Indicator lights 357 through 360 (12 to 15) are associated respectively with these switches. If it is assumed that the circuit had been set up for both tools to make connections in their respetcive Z1 positions, switches PB AZ1 and PB BZ1 had been actuated to unlatch relays CRL 9 (5) and CRL 10 (7). Indicator lights 357 and 359 are on through contacts CRL 9-2 and CRL 10-2 to indicate that these positions are selected. Contact CRL 9-3 (16) and CRL 10-3 (17) are open de-energizing respectively valve solenoid A and valve solenoid B to actuate cylinder units 211 to withdraw the fork slides 212 on the A and B carriages respectively permitting the tools to be moved downward to their lower or Z1 positions. Contacts CRL 9-4, CRL 9-5, CRL 10-4 and CRL 10-5 are in a Z position fault check circuit to be described.

Assume that Z2 positions for both tools are now to be selected. Switches PB-AZ2 and PB-BZ2 are actuated to latch relays CRL 9 and CRL 10 and indicator lights 356 and 358 are lit. Contacts CRL 9-3 and CRL 10-3 now close to energize valve solenoids A and B to position the fork slides 212 with respect to the headed bolts 210 so that downward movement of the tools is limited to the Z2 positions.

*Program Circuit for X and Y Positions*

Six program switches PB 1 (110), PB 2 (113), PB 4 (116), PB 8 (119), PB 16 (122) and PB 32 (125) are provided for placing information on the machine to set up the number of modules of movement for both tools in both the X and Y directions. When these switches are actuated they latch respective program relays CRL 1 to CRL 6 and light associated program lights 361 to 366. The relays and lights are held through the No. 3 contacts (CRL 1-3, for example). The No. 1 contacts and No. 2 contacts of the relays (CRL 1-1 and CRL 1-2, for example) unbalance a bridge circuit shown in FIGURES 26 and 37.

The terminal points of the bridge circuit are represented by conductors PA 5 and PA 6 and a D.C. voltage is impressed between these points (75) through the contacts of relay CR T (199). Normally conductor PA 5 is the negative side of the bridge and conductor PA 6 is the positive side, since relay CR T is normally energized. One side of the bridge comprises potentiometers 145X (78) and 145Y (84), in parallel, driven by the X and Y drive mechanisms respectively. The wiper arm of only one of these potentiometers is connected to output conductor PA 7 (79) at any one time. Resistors R-D1 and R-D2, in series with the potentiometer 145X, are placed in or out of circuit by contacts CRL AY-7 and CRL BX-5. These resistors shift the voltage across the potentiometer, during X motion of the A and B tools, to compensate for the fact that the A tool is positioned one module behind the B tool in the X direction. The other side of the bridge consists of resistors R6, R5, R4, R3, R2 and R1 connected in series between conductor PA 5 and output conductor PA 15, and resistors R7, R8, R9, R10, R11, and R12 connected in series between conductor PA 15 and conductor PA 6. The normally closed No. 1 contacts of the program relays CRL 1 to CRL 6 are connected in parallel, respectively, with resistors R6 to R1. The normally open No. 2 contacts of the program relays CRL 1 to CRL 6 are connected in parallel respectively with resistors R7 to R12.

Assume that resistors R6 and R1 have values which provide for voltage drops of 1, 2, 4, 8, 16 and 32 volts respectively, and assume that resistors R7 to R12 have corresponding values respectively. Further assume that for each module of movement, the potentiometer wiper arms will sweep a one volt drop. Now, when a positive bridge output voltage appears between an output point 368, in conductor PA 15, and an output point 369, in conductor PA 7 (see FIGURE 37) this output voltage determines the number of modules a tool will be moved. The bridge output is positive when output point 368 is positive with respect to output point 369. When all of the program relays are unlatched, resistors R6 to R1 are shorted by the No. 1 contacts of the program relays and the voltage at point 368 (conductor PA 15) is zero with respect to conductor PA 5. The voltage at point 369 (conductor PA 7) is either zero or positive with respect to conductor PA 5, depending upon the position of the wiper arm in circuit. The bridge output voltage then is either zero or negative. When one or more program relays are latched, the associated No. 1 contacts open and associated resistors are placed in circuit between conductors PA 5 and PA 15 making output point 368 (conductor PA 15) positive with respect to conductor PA 5 and a positive bridge output may appear. The output voltage across the resistor side of the bridge may range one volt to 63 volts, depending upon the number of program switches actuated; therefore, the tools may be moved up to 63 modules at the X or Y direction.

*Detector Circuit*

Figure 37:
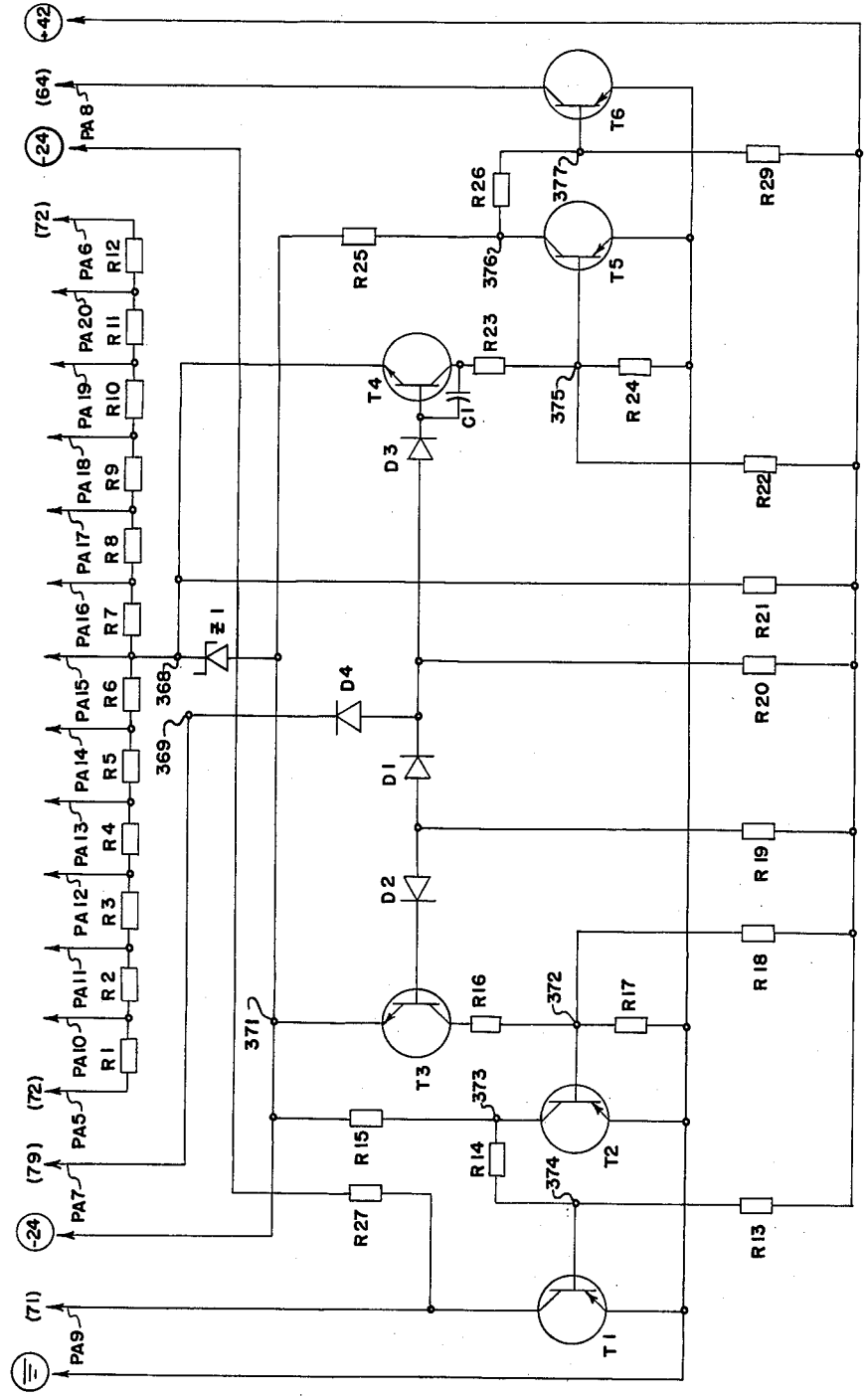

A detector circuit for controlling the movement of the tools in response to bridge output is shown in FIGURE 37. This circuit comprises a "slow down" amplifier consisting essentially of transistors T3, T2 and T1 and the "stop" amplifier, consisting essentially of transistors T4, T5 and T6. Output point 368 is maintained at a voltage of minus 18 D.C. by the power supply through a Zener diode Z1 which provides for a constant 6 volt drop between a point 368 and point 371.

Referring to the slow-down amplifier, with no positive bridge output voltage, point 371 is more negative than the point 369; therefore, transistor T3 draws current and conducts. Point 372 is negative; therefore, transistor T2 draws current and conducts. Point 373 then assumes ground potential and point 374 becomes positive to cut off transistor T1 so that no current flows through conductor PA 9. This is the normal condition of the slow-down amplifier.

Referring to the stop amplifier, with a slightly negative bridge output transistor T4 draws current and conducts. Point 375 then becomes negative and transistor T5 draws current and conducts. Point 376 then assumes ground potential and the point 377 becomes positive to cut off transistor T6 so that no current flows through conductor PA 8. This is the normal condition of the stop amplifier.

X Motion for the A Tool

Operate light 379 (109) in the program switch circuit is on indicating that the machine may be programmed and operated for X or Y motion. AX indicator light 380 (53) is on to indicate that the program information now given to the machine is for AX motion. Potentiometer 145X (78) is connected in the bridge circuit through relay contact CRL I-2 (80).

Assume that it is desired to move the A tool 16 modules in the X direction. Program switch PB 16 (122) is actuated to latch relay CRL 5 (123) and program light 365 goes on. Contact CRL 5-1 opens and contact CRL 5-2 closes to impress 16 volts between conductor PA 15 and conductor PA 5 and, since the wiper arm of potentiometer 145X is at the zero position, a positive output of 16 volts appears between output points 368 and 369. The output point 369 now assumes a voltage of minuus 34 D.C. with respect to the point 358 which is held at a voltage of minus 18 D.C. Point 369 therefore is more negative than point 371 and transistor T3 ceases to draw current and cuts off. Point 372 becomes positive and transistor T2 ceases to draw current and cuts off. Point 374 then becomes negative and transistor T1 draws current and conducts. Current now flows through conductor PA 9 to energize relay CR E (70), its contact CR E-1 (96) closing to energize valve solenoid XD (96) and valve solenoid YD (97). These solenoids open valves 153 in the control chamber passages 150 of the X and Y drive cylinders so that fluid will flow through both orifices 152 and 154 and the cylinders are conditioned to move the tools at high speed. The valves of both drive cylinders are actuated, however only the X drive cylinder is to be operated at this time.

Since the point 369 is more negative than point 368, transistor T4 ceases to draw current and stops conducting. Point 375 becomes positive and transistor T5 ceases to draw current and stops conducting. Point 377 then becomes negative and transistor T6 draws current and conducts. Current now flows through PA 8 (64) to provide ground for relays CR A (59), CR C (62), CR S (198) and CR T (199) which are already energized.

If a program switch has been erroneously actuated to latch its respective relays, cancel switch PB-C (22) may be actuated to unlatch all of the program relays so that the correct program information may be given to the machine.

Operate switch PB-O (44) is now actuated to latch relay CRL H (44). Contact CRL H-1 (22) opens to render cancel switch PB C ineffective. Contact CRL H-4 (85) closes to unlatch relay CRL AX (85). CRL H-5 (109) opens to take ground away from the program switches, to render them ineffective to place further information on the machine, and from operate light 379 (109) which goes out. Contact CRL AX 2 (54) closes providing ground through contact CRL AY 4 and CRL C-2 to light AY indicator light 381 to indicate that the next program information to be given to the machine will be for Y motion of the A tool. Contact CRL AX 3 (57) opens to remove ground from the relays CR A, CR C, CR S and CR T, but these relays are grounded through transistor T6 and remain energized. Contact CRL AX 4 (90) opens to deenergize valve solenoid XF (90) admitting live air to the forward end of the X drive cylinder. Contact CRL AX 5 (91) closes to energize valve solenoid XR (91) through contact CRL I-4 exhausting the reverse end of the X drive cylinder and the B carriage is now driven in the X direction carrying with it the DF carriage and the A carriage.

As soon as the B carriage moves away from its home position, limit switch LS BX (49) opens. The AX indicator light 380 (53) goes out. Relay CR G (49) is de-energized.

As the carriages are moved in the X direction, the wiper arm for the potentiometer 145X picks off increasing voltage so that the voltage of conductor PA 7 and bridge output point 369 is increasing and the bridge output is decreasing. When the bridge output voltage decreases to 6 volts, the voltage at points 369 and 371 is the same; and when the bridge output voltage decreases to slightly less than 6 volts, point 369 becomes more positive than point 371 and transistor T3 now draws current and conducts. Transistor T2 also draws current and conducts, and transistor T1 is biased to cut off so that no current flows through conductor PA 9 (71). Relay CR E (70) now de-energizes and its contact CR E-1 (96) opens to de-energize valve solenoids XD and YD. The valves 153 of the X and Y drive cylinders now close and the X drive cylinder now drives at low speed.

A curve shown in FIGURE 36 illustrates the bridge output voltage. The zero voltage reference line represents the voltage at output point 368. The curve "*m*" represents the voltage of output point 369. The curve *m* shows a decreasing bridge output voltage corresponding to the position of the A tool. Point "*a*" represents the point where the slow-down amplifier effects low speed drive. The low speed drive is to assure that the pawl 143 will engage the proper tooth of the sprag 142 to position the X tool.

The carriages continue to move until the bridge output voltage becomes zero and then goes slightly negative. Point "*b*" on the curve represents the point where the bridge output is zero, and at point "*c*" the bridge output voltage has become slightly negative. When this occurs, output point 368 is slightly negative with respect to output point 369 and transistor T4 draws current and conducts. Transistor T5 draws current and conducts and transistor T6 is biased to cut off.

Position Fault Check

Current now ceases to flow through conductor PA 8 (64) and ground is taken away from relays CR A (59), CR C (62), CR S (198) and CR T (199). Relays CR A, CR S and CR T immediately de-energize, contacts CR S-1 (97) and CR A-1 (98) closing to energize valve solenoid XS (98) to actuate cylinder unit 146 to engage the pawl 143 in the sprag 142 of the X drive mechanism to stop further movement of the carriages. The output point 369 is now represented by point "*d*" on the curve. Contact CR S 4 (202) closes to light the XY position fault light 382. Relay CR C does not de-energize immediately due to a time delay circuit consisting of capacitor C–S1 (61), resistor R–S1 (61) and resistor R–S2 (62); therefore, its contact CR C–3 (199) remains open so that relays CR S and CR T are not immediately re-energized. The contacts of relay CR T (74, 75, 76) are now reversed to reverse the polarity of the voltage across the bridge circuit. At the same time the bridge output voltage is shifted to volts by resistors RD 4 and RD 5 (75). Referring again to FIGURE 36, when the output voltage is reversed the curve *m* appears as curve 1/*m*. When the output voltage is shifted, the curve 1/*m* appears as curve n. It will be seen that the point "d" now appears on the curve n and represents a still negative output; therefore, transistor T6 remains cut off and, after the time delay, relay CR C (62) is de-energized and relays CR S (198) and CR T (199) are again energized through contact CR C–3 (199). The fault light 382 (202) goes out and the pawl 143 remains engaged since relay CR A (59) is not re-energized.

Suppose however that the pawl 143 did not engage the proper tooth of the sprag 142, and the carriages move one module past the program position. With this condition, the voltage of output point 369 is indicated by point "e" on the curve m of FIGURE 36, which is one volt more positive than point "d." Now when the bridge output voltage is reversed and shifted by relay CR T, the point "e" on curve m appears as point "f" on curve n. Point "f" now represents a zero bridge output voltage which will cause transistor T6 to again conduct and current to flow through conductor PA 8 to re-energize relay CR A and again provide ground to hold relay CR C which had not de-energized due to the time delay. Relays CR S and CR T are not re-energized since contact CR C–3 remains open and contact CR S–3 is open. Contact CR A–1 (98) opens, however valve solenoid XS (98) remains energized to hold the pawl engaged since contact CR S–1 (97) is closed. Contact CR S–4 (202) remains closed holding the XY position fault light 382 indicating that a position fault has occurred.

After the position fault check, which occurs during the time delay period in which relay CR C is held energized, and assuming no position fault, relay CR C de-energizes as above described. Its contact CR C–2 (20) closes to unlatch the program relays to remove program information from the bridge, and to unlatch relay CRL H (19). Contact CR L H1 (22) closes to render cancel switch PB–C (22) effective. Contact CRL H 3 (35) closes to unlatch relay CRL I (31) and to latch relay CRL II (32) through contacts CRL AX 1, CRL AY 2 and CRL D 1. Contact CRL H5 (109) closes providing ground for the program switches and lighting operate light 379 (109). Contact CRL I–2 (80) opens to disconnect the wiper arm of potentiometer 145X from conductor PA 7. Contact CRL I–4 (91) opens to de-energize valve solenoid XR (91) admitting live air to the reverse end of the X drive cylinder. Live air is now admitted to both ends of the cylinder to remove pressure of the sprag 142 on the pawl 143 and facilitate disengagement of the pawl when it is next disengaged. Contact CRL II–1 (63) closes providing ground to energize relay CR C (62) and to hold relays CR S and CR T through contact CR S–3 (198), conductor RP 60 (59, 198), contact CRL BY 5 (64), and contact CRL AY 6 (66). Relay CR B (63) had been previously energized. Contact CRL II–2 (82) closes to connect the wiper arm of potentiometer 145Y to conductor PA 7. The machine is now ready to receive program information for Y motion of the A tool.

Y Motion of the A Tool

Assume that A tool is to be moved five modules in the Y direction. Program switches PB 1 (110) and PB 4 (116) are actuated to latch respectively program relays CRL 1 and CRL 3 and to light respective program lights 361 and 363. A bridge output voltage of 5 volts is now impressed between output points 368 and 369. Since this output voltage is less than 6 volts, transistor T1 remains cut off and relay CR E (70) remains de-energized so that the valves 153 remain closed and the Y drive cylinder remains in low speed condition. Transistor T6 now conducts and provides ground through conductor PA 8 to hold relays CR B, CR C, CR S and CR T.

Operate switch PB–O (44) is actuated to latch relay CRL H (44). Through its contacts, cancel switch PB C is made ineffective, ground is removed from the program switches, the operate light 371 goes out, and relay CRL AY (86) is unlatched through contacts CRL II–3 and CRL H–4. Contact CRL AY–4 (54) opens and the AY indicator light 381 goes out. Contact CRL AY–5 (55) closes and lights BX indicator light 383 through contact CR N–1 to indicate that the next program information is for the X motion of the B tool. Contact CRL AY–6 (66) opens removing ground from relays CR B, CR C, CR S and CR T which is now provided through transistor T6. Contact CRL AY–8 (93) opens to de-energize valve solenoid YF admitting live air to the forward end of the Y drive cylinder. Contact CRL AY 9 (94) closes to energize valve solenoid YR through contact CRL II–4 to exhaust the reverse end of the Y drive cylinder and the B and A carriers begin to move from their home positions at low speed. Limit switch LS BY (27) now opens but has no effect since contact CRL E 1 is open.

When the program position is reached, transistor T6 stops conducting to de-energize relay CR B, CR S and CR T and to take ground away from relay CR C which remains energized for the time delay period. Contacts CR B–1 and CR S–2 (99) both close to energize valve solenoid YS actuating cylinder unit 146 and the pawl 143 is engaged with the sprag 142 to stop further Y motion. The position fault check then occurs as described above during the delay period and, assuming no position fault, relay CR C de-energizes. Its contact CR C–1 (4) closes to unlatch relay CRL J (4) through contact CRL AY–1 (4). Contact CR C–2 (20) closes to unlatch the program relays and relay CRL H (19). Contact CRL J–1 (18) closes to energize valve solenoid C (18) actuating cylinder units 182 and 185 to disengage the shot pins 186 and 187 of the A and B carriage interlocks so that the A, B and DF carriages are no longer locked together. Contact CRL J–2 (66) closes and contact CRL J–3 (67) opens to de-energize valve solenoid PA (66) actuating cylinder units 157 and 175 to engage the taper pins of the A carriage and the A carrier in their respective slide rods to accurately position and lock the A carriage and A carrier. As previously described the contacts of relay CRL H make cancel switch PB–C effective, provide ground for the program switches and light the operate light 379 (109). Its contact CRL H–3 (35) closes to unlatch relay CRL II (34) and to latch relay CRL III (35). Contact CRL II–2 (82) opens to disconnect the wiper arm of potentiometer 145Y from conductor PA 7. Contact CRL II–4 (94) opens to de-energize valve solenoid YR admitting live air to the reverse end of the Y drive cylinder. Live air is now admitted to both ends of this cylinder to remove pressure from the pawl 143 by the sprag 142 to facilitate disengagement of the pawl when it is next disengaged. Contact CRL III–1 (59) closes to provide ground, through contact CRL BX–3 (58), to energize relay CR C and to hold relays CR S and CR T when contact CR C–3 (199) opens. Relay CRL III–2 closes to connect the wiper arm of the potentiometer 145X to conductor PA 7. The machine is now ready to receive program information for X motion of the B tool.

X Motion of the B Tool

Assume it is desired to position the B tool at position X 26. Program switches PB 16, PB 8 and PB 2 are actuated to latch respective program relays. Since the wiper arm of the potentiometer 145X is picking off 16 volts, a positive bridge output of 10 volts now appears between points 368 and 369. Transistor T1 then conducts to open the valves 153 to condition the X drive cylinder for high speed. Transistor T6 conducts to provide ground through conductor PA 8 for relays CR C, CR S and CR T which are already energized. Operate switch PB–O (44) is now actuated to latch CRL H, its contacts 1, 2, 3 and 5 perform the functions previously described. Its contact CRL H 4 (85) closes to unlatch relay CRL BX (87) through contact CRL III–3. Contact CRL BX–3 (58) opens removing ground from relays CR C, CR S and CR T now provided by transistor T6. Contact CRL BX-4 (58) closes providing ground through contacts CRL G1 (59) and CRL III-1 (59) to energize relay CR A (59), opening its contact CR A-1 (98) to de-energize valve solenoid XS actuating cylinder unit 146 to disengage the pawl 143 from the sprag 142 of the X drive mechanism. Contact CRL BX 6 (186) opens to de-energize relay CR N (186). Contact CR N 1 (55) opens and BX indicator light 383 (53) goes out. Contact CR N 2 (56) closes to light BY indicator light 384 (56) to indicate that the next program information will be for the Y motion of the B tool. Contact CR N 3 (92) closes to energize valve solenoid XR (91) exhausting the reverse end of the X drive cylinder. Since both ends of the cylinder had been open to live air, the X drive mechanism now drives the B carriage which moves away from the A carriage.

The DF carriage is carried with the B carriage since the finger 184 on the B carriage is still engaged in the fork member 183 of the DF carriage.

When the bridge output voltage decreases to 6 volts, transistor T1 cuts off and the valves 153 close so that the X drive mechanism drives at low speed. When the B tool reaches its X position, transistor T6 cuts off removing ground from relays CR A, CR C, CR S and CR T. Relay CR A de-energies and its contact CR A1 (98) closes to energize valve solenoid XS to engage the pawl 143 in the sprag 142 and stop further motion. The position fault check is again made, as previously described, and relay CR C de-energizes after the time delay. Its contact CR C-2 (20) closes to unlatch the program relays and relay CRL H (19). Contacts 1, 2, 4 and 5 of relay CRL H (19) perform the functions previously described. Contact CRL H 3 (35) opens to unlatch relay CRL III (37) and to latch CRL IV (38). Contact CRL III-2 (81) opens to disconnect the wiper arm of potentiometer 145X from conductor PA 7. Contact CRL IV-1 (64) closes to provide ground, through contact CRL BY-6 (65) to energize relay CR C and to hold relays CR S and CR T. Contact CRL IV-2 (68) opens and contact CRL IV-3 (69) closes. Valve solenoid PB (68) had been energized, actuating cylinder units 158 and 176 to disengage the taper pins of the B carrier and B carriage, through contact CRL IV-2 and contact CRL BY-6. This valve solenoid is now held energized through contact CRL IV-3. Contact CRL IV-4 (83) closes to connect the wiper arm of potentiometer 145Y to conductor PA 7. The machine is now in position for Y motion of the B tool.

Y Motion of the B Tool

Assume that it is desired to position the Y tool at position Y9. Program switches PB 8 and PB 1 are actuated and since the wiper arm of potentiometer 145Y is picking off 5 volts, a positive bridge output of 4 volts will appear between output points 368 and 369. Transistor T6 conducts and provides ground to hold relays CR C, CR S and CR T. Operate switch PB-O (44) is actuated to latch relay CRL H. Relay CRL H, contacts 1, 2, 3 and 5 perform the functions previously described and contact CRL H 4 (85) closes to unlatch relay CRL BY (88) through contact CRL IV-5. Contact CRL BY 3 (56) opens and BY indicator light 384 goes out. Contact CRL BY-4 (64) closes and contact CRL BY-6 (65) opens. Contact CRL BY-6 removes ground now provided through transistor T6, and contact CRL BY-4 provides ground, through contacts CRL G-2 and CRL IV-1, to energize relay CR B (63) and its contact CR B-1 (99) opens to de-energize valve solenoid YS actuating cylinder unit 146 to disengage the pawl 143 from the sprag 142 of the Y drive mechanism. Contact CRL BY 7 (95) closes to energize valve solenoid YR (94) to exhaust air from the reverse end of the Y drive cylinder. Since live air had been admitted to both ends of the cylinder, the B carrier is now driven in the Y direction.

As the B carriage moves away from the DF carriage, the finger 184 disengages from the fork member 183 and the valve 321, in the DF carriage is actuated to engage the taper pin in the slide rod 111 to accurately position and lock the DF carriage. When the B tool reaches its Y position, transistor T6 cuts off removing ground from relays CR B, CR C, CR S and CR T. Contacts CR B-1 and CR S-2 (99) close to energize valve solenoid YS actuating cylinder unit 146 to engage the pawl 143 with the sprag 142 of the Y drive mechanism. The position fault check is then made and relay CR C is de-energized after the time delay. Contact CR C-2 (20) closes to de-energize the program relays and to unlatch relay CRL H. Relay CRL H and contacts 1, 2, 4 and 5 perform the functions previously described and contact CRL H-3 (35) closes to unlatch relay CRL IV (40) to latch CRL V (41). CRL IV-3 (69) opens to de-energize valve solenoid PB (68) actuating cylinder units 158 and 176 to engage the taper pins of the B carriage and B carrier in the respective slide rods to accurately position and lock the B carriage and carrier. CRL IV-4 (83) opens to disconnect the wiper arm of potentiometer 145Y from conductor PA 7.

Contact CRL V-1 (59) closes providing ground to energize relay CR C and to hold relays CR S and CR T. CRL V-2 (109) opens and the operate light 379 goes out. CRL V-3 (143), in the circuit for motor M1 (141) opens.

Wrapping Cycle

Figure 31:
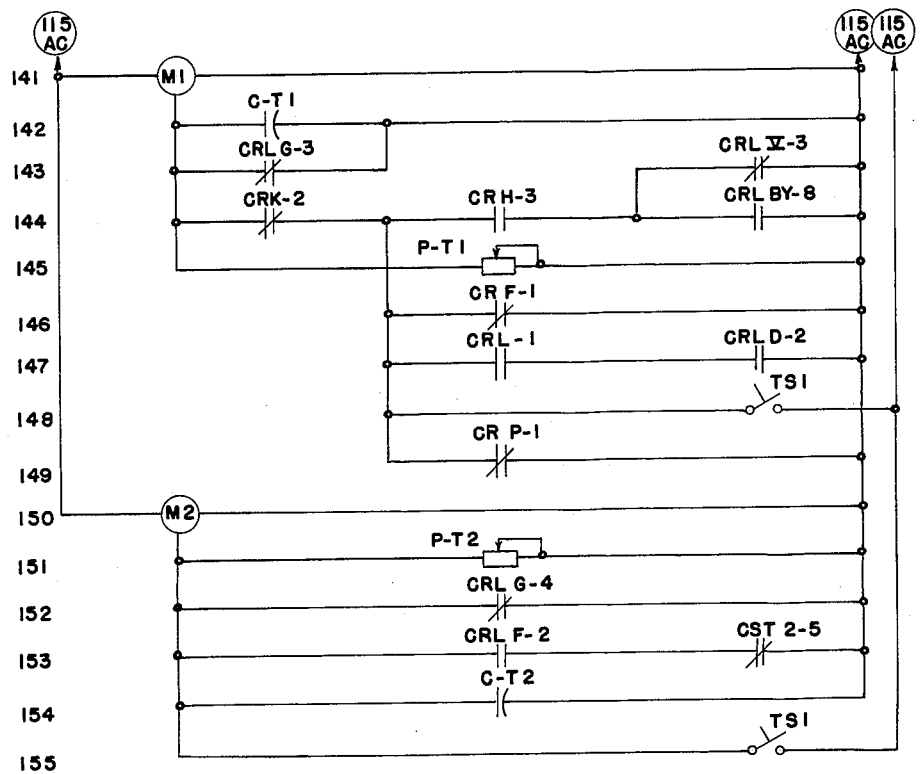
Figure 32:
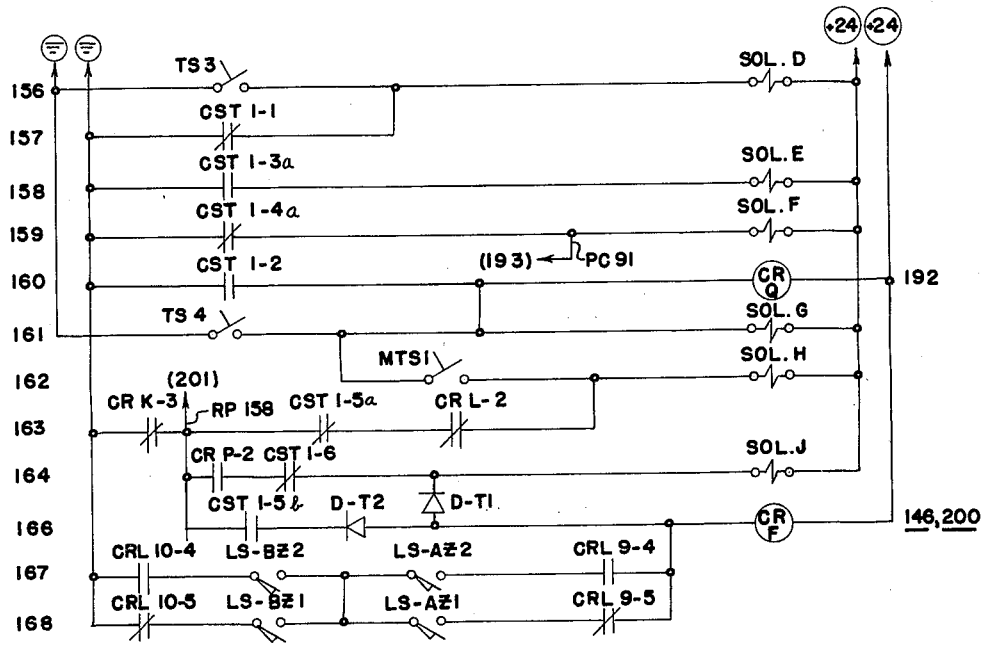
Figure 33:
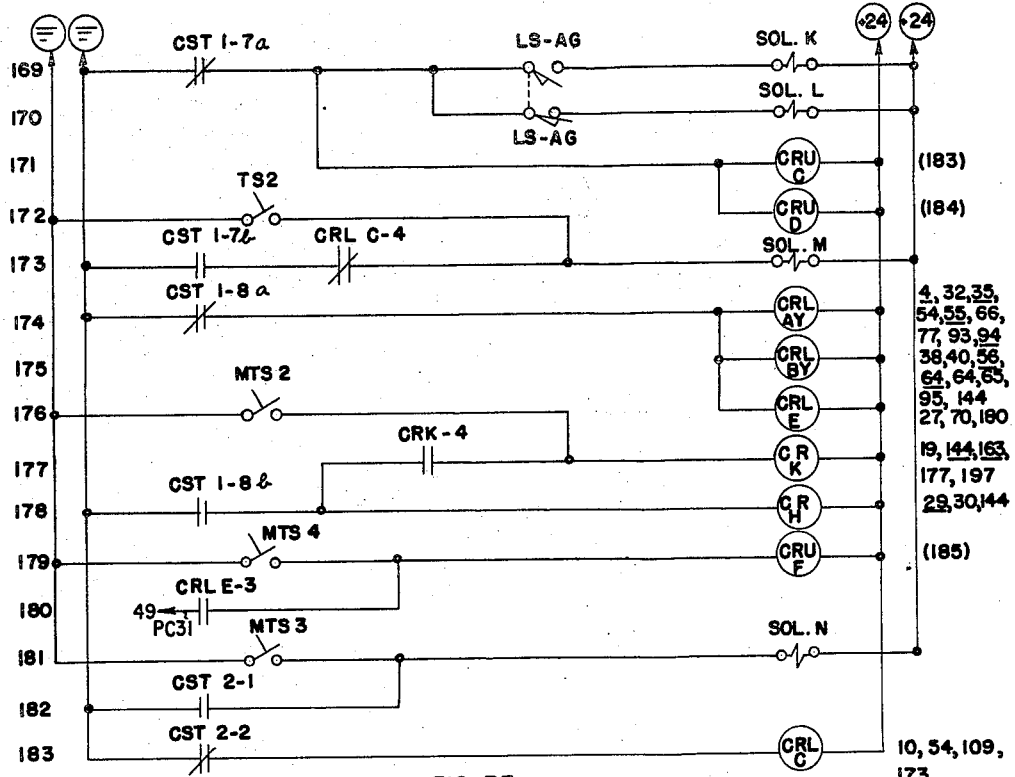
Figure 34:
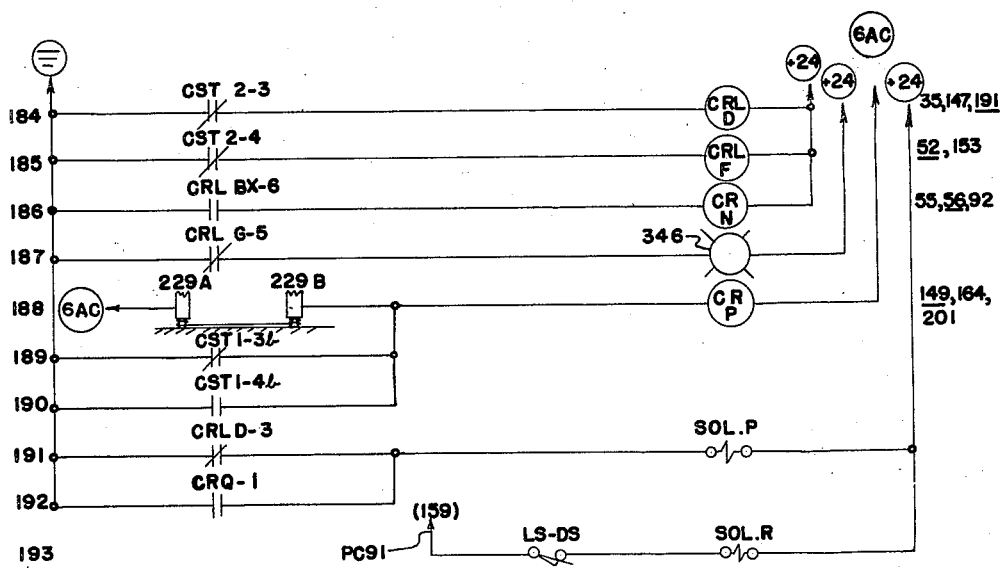
Figure 35:
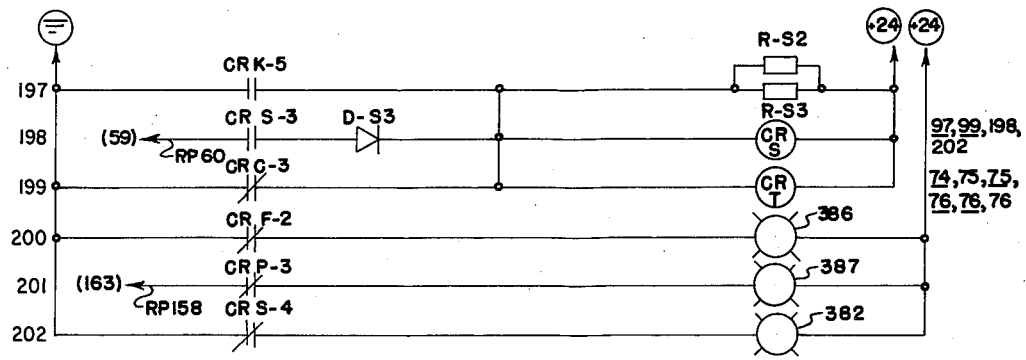

Referring now to FIGURE 31, the circuit for the motor M1 of the cam timer No. 1 is shown at lines 141 to 149. Motor M1 does not run so long as there is a short across capacitor CT-1 (142). During the cycle up to the present time a short had existed across the capacitor so that motor M1 did not run. The motor now starts since contact CRL V-3 has just opened to remove the short. Toggle switch TS-1 (148) is provided for manually operating the motor intermittently to observe individual functions performed by the cam timer. Eight cams are driven by the motor M1 and each cam controls either one or two contacts, identified as CST 1–3A and CST 1–3B for example. These contacts close and open in the sequence to be described.

Contact CST 1–1 (157) closes to energize valve solenoid D (156) which actuates cylinder unit 263 closing cutters 252 and strippers 251 and 253 to cut the wire and insulation in preparation for stripping. Switch TS-3 (156) is provided for closing the cutters and strippers apart from the machine cycle.

Contact CST 1–7A (169) closes and contact CST 1–7B (173) opens. Assume that the DF carriage has moved one module away from the A carriage, the contacts of limit switch LS–AG (169, 170) are in their normal condition and valve solenoid K (169) is energized, actuating cylinder unit 309 and the A gripper finger 312 clamps the wire at the A tool bit. If the DF carriage had not moved away from the A carriage, the contacts of limit switch LS–AG would be reversed and valve solenoid L (170) would be energized, actuating cylinder unit 334 to move the dressing finger assembly 326 to clamp the wire at the A tool bit. In this situation the A gripper may not be used due to interference with the dressing finger 335. Contact CST 1–7A also unlatches relay CRL C (171) and CRL D (172). Contact CRL C-1 (10) opens removing ground from the program switch circuit through conductor RP 18 (10, 109); removing ground from the index table position change circuit (FIG. 30) through conductor CP 13 (10, 128); and removing ground from the Z position change circuit (FIGURE 21). Position change light 348 (128) goes out. This assures that no program changes, panel position changes, or Z position changes may be made during the wrapping cycle. Contact CRL C-4 (173) closes, but contact CST 1–7B opens simultaneously so that valve solenoid M (173) remains de-energized; the cylinder unit 300 is not actuated and the B gripper fingers 299 remain closed clamping the wire at the B tool bit. Contact CRL D–3 (191) closes to energize valve solenoid P (191) to actuate cylinder unit 282 and the clamping foot 283 to clamp the wire in the wire preparation unit.

Contact CST 1–2 (160) closes to energize relay CR Q (160) and to energize valve solenoid G (161) which actuates cylinder unit 92 to retract the feed assembly housing 276 and the sleeve assembly of the wire preparation unit to strip the insulation from the wire. Manual switch TS 4 (161) is provided for stripping the wire apart from the machine cycle.

Contact CST 1–3A (158) closes and contact CST 1–3B (189) opens. Valve solenoid E (158) is energized through CST 1–3A directing air to the cylinder chambers 225 to close the bits of the A and B tools. This is accomplished while wire is held against the bit by the respective gripper fingers since the bit members 231 are withdrawn into the bit sleeves 230. Contact CST 1–3B (189) has no effect since contact CST 1–4B (190) is closed.

Contact CST 1–7A (169) opens and contact CST 1–7B (173) closes. Valve solenoid K (169) is de-energized actuating cylinder unit 309 to open the A gripper (or valve solenoid L (170) is de-energized actuating cylinder unit 334 to move the dressing finger away from the A tool bit). Valve solenoid M (173) is energized through CST 1–7B, actuating cylinder unit 300 to open the B gripper fingers 299. Toggle switch TS 2 (172) is provided for opening and closing the B gripper fingers apart from the machine cycle.

Contact CST 1–5A (163) closes and contact CST 1–5B (166) opens. Valve solenoid H (162) is energized through contacts CR K–3 and CR L–2 (163), directing air to cylinder chambers 202 of the A and B carriages and to cylinder chamber 323 of the DF carriage to move the A and B tools and the dressing finger assembly 326 down in the Z direction. Manual switch MT–S1 (162) is provided for energizing and de-energizing solenoid M, apart from the machine cycle, when switch TS 4 (161) is closed. Contact CST 1–5B (166) opens to take ground away from relay CR F (166). Relay CR F is not de-energized, however, if the A and B tools have moved down to their proper Z positions. Since the Z–2 positions have been selected for both tools, relays CRL 9 (8) and CRL 10 (10) are latched and their contacts CRL 9–4 (167) and CRL 10–4 (167) are closed. If both tools are in the proper Z–2 position, limit switches LS–BZ2 and LS AZ2 (167) are closed and provide ground to hold relay CR F energized. For any selected Z positions for the tools, relay CR F will be held if the tools are in the selected positions.

If, however, one of the tools is not in its proper position, relay CR F will de-energize when contact CST 1–5B opens. Its contact CR F–1 (146) then closes to stop motor M1 (141) and its contact CR F–2 (200) closes to light Z position fault light 386 (200). This is the Z position fault check.

Contact CST 1–1 (157) opens to de-energize valve solenoid D (156), actuating cylinder unit 263 to open the cutters 252 and strippers 251 and 253 in the wire preparation unit.

Contact CST 1–6 (164) closes to energize valve solenoid J (164) which directs air to the A and B tool motors 218 to rotate the wrapping bits 229 whereby both ends of the wire are wrapped on respective terminals. Valve solenoid J had not been energized through contact CST 1–5B (166) since diode D–T1 (165) prevented current flow through this contact. Contact CST 1–6 also picks up ground for relay CR F. As the wire is being wrapped on the terminals, the A and B tools move upward and the respective Z limit switches open. Relay CR F would then de-energize and stop motor M1 (141) if ground for this relay were then picked up by relay CST 1–6.

Contact CST 1–4A (159) closes and contact CST 1–4B (190) opens. Valve solenoid F (159) is energized to direct air to the tube 274 to blow the stripped insulation from the wire preparation unit. Valve solenoid R (193) is energized through conductor PC 91 (159, 193), and limit switch LS–DS (193) actuating cylinder unit 337 to actuate the pusher finger 336 to push the wire off the dressing finger 335. If the DF carriage is separated from the A carriage less than two modules, limit switch LS–DS is open to prevent valve solenoid R from becoming energized. This is necessary since the pusher finger 336 would interfere with the A bit or the A gripper in this situation. When contact CST 1–4B (190) opens, relay CR P (188) will be de-energized unless it is held by current flowing through the A and B bits 229A and 229B and the wire connected between them. This is the connection fault check.

If relay CR P is de-energized due to a connection fault, its contact CR P–1 (149) closes to stop timer motor M1; its contact CR P–2 (164) opens to de-energize valve solenoid J (164) and stop the tool motors; and its contact CR P–3 (201) closes to light connection fault light 387 (201).

Contact CST 1–5A (163) opens and contact CST 1–5B (166) closes. Valve solenoid H (162) is de-energized venting air from cylinder chambers 202 of the A and B carriages and cylinder chamber 323 of the DF carriage raising the A and B tools and the dressing finger assembly 326 to their original positions. Contact CST 1–5B picks up ground to hold relay CR F (166) which is now held through contact CST 1–6.

Contact CST 1–3A (158) opens and contact CST 1–3B (189) closes. Valve solenoid E (158) is de-energized, venting air from the cylinder chambers 225 of the A and B tools to open the A and B tool bits. Contact CST 1–3B picks up ground to hold relay CR P.

Contact CST 1–6 (164) opens to de-energize valve solenoid J (164) shutting off air to stop the A and B tool motors 218. It will be noted that the tool bits were opened before the tool motors were stopped. This permits the dog members 243 fixed to the gear shafts 224 to engage the respective housing slots 244 to stop rotation of the bits in indexed position. Motor torque is absorbed through the friction clutches 220 and the motors stop immediately after the bits are indexed.

*Tools Return Home*

Contact CST 1–8A (174) closes and contact CRL 1–8B (178) opens. Relays CRL AY (174), CRL BY (175) and CRL E (176) are latched through contact CST 1–8A. Contact CRL AY 6 (66) closes to energize valve solenoid PA (66) through contact CRL J–2 actuating cylinder units 157 and 175 to disengage the taper lock pins of the A carrier and A carriage which now ride free on their respective slide rods. Contact CRL AY–8 (93) closes to energze valve solenoid YF (93) exhausting the forward end of the Y drive cylinder. Contact CRL AY–9 (94) opens and since contact CRL II–4 is open and contact CRL BY–7 (95) opens simultaneously, valve solenoid YR is de-energized admitting live air to the reverse end of the Y drive cylinder. Contact CRL BY–5 (64) closes providing ground to energize relay CR B (63) through contacts CRL G–2 and CRL AY–6. Contact CR B–1 (99) opens to de-energize valve solenoid YS actuating cylinder unit 146 to disengage the pawl 143 from the sprag 142 of the Y drive mechanism. Contact CRL BY 6 (65) closes providing ground through contact CRL IV–2 to energize valve solenoid PB (68) actuating cylinder units 158 and 176 to disengage the taper pins of the B carrier and B carriage from their respective slide rods. Now the B carrier is driven toward its home position by the Y drive cylinder. The B carriage is still held in its X position by the pawl 143 of the X drive mechanism and the DF carriage is held in its X position by its taper pins. Contact CRL E–1 (27) closes and relays CRL AX (27)

and CRL BX (28) will be latched when the B carrier reaches home to close limit switch LS BY (27). Contact CRL E-2 (7) closes to provide ground through contact CR M-2 to energize relay CR E (70). Its contact CR E-1 (96) closes to energize valve solenoids XD and YD opening the valves 153 in the drive cylinders to condition the cylinders for high speed drive.

Relay CR H (178) is de-energized when contact CST 1-8B opens. Contact CR H-1 (29) closes to unlatch relay CRL V. Contact CRL V-1 (59) opens removing ground from relays CR C, CR S and CR T. When relay CR C de-energizes after the time delay relays CR S and CR T are again energized.

Contact CST 1-2 (160) opens to de-energize relay CR Q (160) and valve solenoid G (161). Valve solenoid G actuates cylinder unit 292 causing the feed assembly housing 276 of the wire preparation unit to return to its original position.

Contact CST 1-4A (159) opens and contact CST 1-4B (190) closes. Valve solenoid F (159) is de-energized to shut off the insulation blowing air in the wire preparation unit. Ground is removed from valve solenoid R (193) through conductor PC 91 (159, 193) actuating cylinder unit 337 to retract the pusher finger 336 of the dressing finger assembly.

Contact CST 1-8A (174) opens and contact CST 1-8B (178) closes to energize relay CR H (178). Contact CR H-3 (144) closes creating a short through contacts CR K-2, CRL IV-3 and CRL BY-8, across capacitor C-T1 of the motor M1 (141) circuit and the motor stops.

As the B carrier moves toward its home position, the interlock finger 184 of the B carriage engages the fork member 183 of the dressing finger carriage and actuates valve 321 to disengage the DF carriage taper pins from the slide rod 111. When the B carrier reaches its home position, limit switch LS-BY (27) closes providing ground through contact CRL E-1 to latch relays CRL AX (27) and CRL BX (28). Contact CRL AX 3 (57) closes providing ground through contact CRL G-1 to energize relay CR A (59). Contact CR A-1 (98) opens de-energizing valve solenoid XS actuating cylinder unit 146 to disengage the pawl from the sprag of the X drive mechanism. Contact CRL AX-4 (90) closes to energive valve solenoid XF to exhaust the forward end of the X drive cylinder. Contact CRL AX-5 (91) opens. Contact CRL BX 6 (186) closes to energize relay CR N (186). Contact CR N-3 (92) opens and since contacts CRL AX-5 and CRL 1-4 are open valve solenoid XR (91) de-energizes admitting live air to the reverse end of the X drive cylinder and the B carriage starts to move to its home position carrying with it the DF carriage.

When the B carriage reaches its home position, limit switch LS-BX (49) is closed. Relay CR G is energized, its contacts having no immediate effect. Relay CRL J (51) is latched. Contact CRL J-1 (18) opens to de-energize valve solenoid C actuating cylinder units 182 and 185 to engage the shot pins of the A and B carriage interlocks so that the A, B and DF carriages are locked together. Contact CRL J-2 (66) opens and contact CRL J-3 (66) closes. Solenoid PA (66) had been energized through contacts CRL AY-6 and CRL J-2 and is now held energized through CRL J-3 to hold disengaged the taper pins of the A carriage and A carrier. Relay CRL 1 (30) is latched through conductor PC 31 (49, 30) and contact CRL H-2. Contact CRL 1-1 closes providing ground, through contact CRL AX-3, to energize relay CR C and to hold relays CR S and CR T. Contact CRL 1-2 (80) closes to connect the wiper arm of potentiometer 145X to conductor PA 7. Relay CRL F (179) receives ground through conductor PC 31 (49, 180) and contact CRL E-3 (180) and is unlatched. Contact CRL F-1 (52) closes to unlatch CRL E (52). Contact CRL F-2 (153) opens. Contact CRL E-2 (70) opens to de-energize relay CR E and its contact CR E-1 (96) opens to de-energize valve solenoids XD and YD closing the valves 153 of the X and Y drive cylinders to condition the cylinders for low speed drive. AX indicator light 380 (53) is lit to indicate that the next program information will be for X motion of the A tool.

Referring now to FIGURE 31 the circuit for motor M2 (150) is shown. The motor does not run so long as there is a short across capacitor C-T2 (154). Contact CRL F-2 (153) has just opened in response to the closing of limit switch LS-BX when the tools reached the home position and motor M2 starts. Note that the motor does not start until the tools are in their home positions.

Contact CST 2-3 (184) closes to latch relay CRL D (183). Contact CRL D-3 (191) opens to de-energize valve solenoid P (191) actuating cylinder unit 282 to release wire clamping foot 283 in the wire preparation unit.

Contact CST 2-1 (182) closes to energize valve solenoid N (181) actuating the rotary piston unit 279 to drive the feed roller 278 to feed the wire to the B tool bit. A manual switch MT-S3 (181) is provided for energizing solenoid N apart from the machine cycle.

Contact CST 2-2 (183) closes to latch relay CRL C (183). Contact CRL C 1 (10) closes to provide ground for the program switch circuit through conductor RP 18; to provide ground for the index table position circuit through conductor CP 13; and to provide ground for the Z position circuit. Indicator light 348 (128) now lights to indicate that an index table position change and Z positon changes may be made. Contact CRL C-3 (109) closes to provide ground, through contact CRL H-5 and CRL V-2 to light the operate light 379. Contact CRL C-4 (173) opens to de-energize valve solenoid M actuating cylinder unit 300 to close the B gripper fingers 299 to grip the wire at the B tool.

Contact CST 2-5 (153), in the motor M2 circuit opens. Contact CST 2-4 (185) closes to latch relay CRL F. Contact CRL F-2 (153) in the motor M2 circuit closes. Contact CST 2-2 (183) opens. Contact CST 2-4 (185) opens. Contact CST 2-3 (184) opens. Contact CST 2-1 (182) opens to de-energize valve solenoid N (181) cocking the rotary piston unit 279 of the wire preparation unit to drive feed roller 278. Contact CST 2-5 (153) closes to create a short, through contact CRL F-2, across capacitor C-T2 (154) to stop motor M2.

This completes the machine cycle and the machine is again ready to receive information for index table quadrant position, Z position, and XY program.

In the above described operating cycle, the information for index table quadrant position, Z position, and AX, AY, BX and BY position is given to the machine by an operator. The remainder of this cycle is automatic. It will be apparent that with slight circuit modification, this information could be given to the machine through a tape or punched card reader so that the machine operation would be completely automatic.

What is claimed is:

1. Apparatus for connecting a wire between spaced terminals on a panel comprising means for supporting a panel in a plane; two wire connecting tools for gripping the ends of a wire and for connecting the ends of the wire to the terminals; means for moving the tools in a plane parallel to that of the panel, from positions adjacent to each other to selected positions; a wire handling unit, for handling a continuous length of wire from a supply reel, mounted for movement with one of said tools; said unit comprising means for stripping the leading end of a wire, means for feeding the leading end of the wire to the other of said tools when said tools are in adjacent positions, and means for cutting the wire adjacent to said one tool and for stripping the trailing end thereof.

2. Apparatus for connecting a wire between spaced terminals on a panel comprising means for supporting a panel in a plane; two carriers mounted for rectilinear movement in a plane parallel to that of the panel; a carriage mounted on each carrier for transverse rectilinear movement in said parallel plane; a wire connecting tool mounted on each carriage; means associated with each tool for gripping a wire at the tool; means for moving said carriers and said carriages individually to move said tools from positions adjacent to each other to selected positions relative to said panel supporting means; and a wire handling device, for handling a continuous length of wire, mounted on one said carriages adjacent one of said tools; and said wire handling device having means for feeding the wire to the other of said tools when said tools are in adjacent positions, for cutting the wire adjacent said one tool, and for stripping the ends of the wire on both sides of the cut.

3. Apparatus for connecting a wire between spaced terminals on a panel comprising means for supporting a panel in a plane; two carriers mounted for rectilinear movement in a plane parallel to that of the panel; drive means for said carriers; a carriage mounted on each carrier for transverse rectilinear movement in said parallel plane; drive means for said carriages; a wire connecting tool mounted on each carriage for rectilinear movement between said parallel plane and that of the panel; drive means for moving said tools; a wire handling device, mounted on one of said carriages adjacent to its associated tool, for handling a continuous length of wire from a supply source; said device having means for cutting the wire, for stripping the wire on both sides of the cut, and for feeding an end of the wire past its associated tool to the other tool; gripping means mounted on the other of said carriages for clamping the end of the wire at its associated tool; and gripping means mounted on said one carriage for clamping the wire at its associated tool.

4. Apparatus for connecting a wire between spaced terminals on a panel comprising means for supporting a panel in a plane; two carriers mounted for rectilinear movement in a plane parallel to that of the panel; drive means for one of said carriers; a carriage mounted on each carrier for transverse rectilinear movement in said parallel plane; drive means for one of said carriages; selectively operable interlock means for locking said carriages together to effect movement of both carriers by said carrier drive means and to effect movement of both carriages by said carriage drive means; a tool holder mounted on each carriage for rectilinear movement between said parallel plane and that of a panel; drive means for said tool holders; a wire connecting tool, including a rotatable bit, supported in each tool holder; motor means in said tools for rotating said bits; said tool bits being positioned adjacent each other when said interlock means is locked; a wire handling device, mounted on one of said carriages adjacent to its associated tool bit, for handling wire from a supply source; said device having means for cutting the wire, for stripping the wire on both sides of the cut, and for feeding an end of said wire past its associated tool bit to the other tool bit; gripping means mounted on the other of said carriages for clamping said end of the wire against its associated tool bit; gripping means mounted on said one carriage for clamping said wire against its associated tool bit; and control means for operating said drive means, said motor means, said wire handling device, and said gripping means.

5. Apparatus for connecting a wire between spaced terminals on a panel comprising means for supporting a panel in a plane; a pair of carriers mounted for rectilinear movement in a plane parallel to that of the panel; drive means for said carriers; a carriage mounted on each carrier for transverse rectlinear movement in said parallel plane; drive means for said carriage; a wire connecting tool mounted on each carriage for rectilinear movement between said parallel plane and that of the panel; drive means for said tools; each tool having a rotatable bit for gripping a wire and connecting the wire to a terminal; motor means in said tools for rotating said bits; a wire handling device, mounted on one of said carriages adjacent to its associated tool bit, for handling wire from a supply source; said device comprising means for feeding a wire to said tools and for cutting and stripping the wire; means mounted on each of said carriages for clamping the wire at its associated tool bit; and control means for operating said wire handling device, for clamping the wire at said tools, for positioning said tools, and for operating said tools to connect the wire to the terminals.

6. Apparatus for connecting a wire between spaced terminals on a panel plane comprising means for supporting a panel in a plane; first and second carriers mounted for rectilinear movement across the panel; drive means for said first carrier; a first carriage mounted on said first carrier for rectilinear movement across said panel in a direction perpendicular to the direction of said carrier movement; drive means for said first carriage; second and third carriages mounted on the other of said carriers for rectilinear movement across said panel in a direction perpendicular to the direction of said carrier movement; selectively operable means for locking said first and second carriages to said third carriage to effect movement of both carriers by said first carrier drive means and to effect movement of all carriages by said first carriage drive means; a wire connecting tool mounted on each of said first and second carriages; a wire handling device mounted on said second carriage adjacent to its associated wire connecting tool, for handling wire from a supply source; said device having means for cutting the wire, for stripping the ends of the wire, and for feeding the wire to said tools; gripping means mounted on said first carriage for clamping the leading end of the wire at its associated tool; a wire guiding member mounted on said third carriage for guiding a wire drawn from said wire handling device when said first tool is moved with respect to said second tool; and gripping means mounted on said second carriage for clomping the wire at its associated tool when said tools have been moved to selected positions.

7. The combination set forth in claim 6 including means for rotating a panel in said plane.

8. Apparatus for connecting a wire between spaced terminals on a panel comprising means for supporting a panel in a plane; a first carrier and a second carrier mounted for rectilinear movement across said panel supporting means; drive means for said first carrier; a first carriage mounted on said first carrier for rectilinear movement across said supporting means in a direction perpendicular to the direction of carrier movement; drive means for said first carriage; second and third carriages mounted on said second carrier for rectilinear movement across said supporting means in a direction perpendicular to the direction of said carrier movement; first and second wire connecting tools mounted respectively on said first and second carriages; selectively operable interlock means for locking said first and second carriages to said third carriage to effect simultaneous drive of said carriers by said first carrier drive means and to effect simultaneous drive of said carriages by said first carriage drive means; said tools being positioned adjacent to each other when said carriages are locked together, and said first tool being moved relative to said second tool when said carriages are not locked together; a wire handling device, mounted on said second carriage adjacent to said second tool, for handling a continuous length of wire from a supply reel; said device having means for stripping the leading end of a wire and for feeding said leading end to said first tool when said tools are in adjacent positions; gripping means mounted on said first carriage for clamping the wire at said first tool whereby the wire is pulled by said first tool during movement relative to said second tool; wire guiding means mounted on said third carriage for guiding the wire pulled by said first tool; gripping means mounted on said second carriage for clamping the wire at said second tool when said tools have been moved to selected positions; and said wire handling device having means for cutting the wire adjacent to said second tool and for stripping the trailing end thereof.

(References on following page)

References Cited in the file of this patent

UNITED STATES PATENTS

| | | |
|---|---|---|
| 2,285,069 | Vickers | June 2, 1942 |
| 2,497,112 | Andren | Feb. 14, 1950 |
| 2,527,458 | Schurr | Oct. 24, 1950 |
| 2,645,959 | Fuchs | July 21, 1953 |
| 2,694,755 | Schuman | Nov. 16, 1954 |
| 2,696,656 | Madden | Dec. 14, 1954 |
| 2,743,503 | Mallina | May 1, 1956 |
| 2,748,634 | Costello | June 5, 1956 |
| 2,777,338 | Thompson | Jan. 15, 1957 |
| 2,845,639 | Jorgensen | Aug. 5, 1958 |
| 2,862,671 | Dimond | Dec. 21, 1958 |